US007891796B2

(12) United States Patent
Masuyama et al.

(10) Patent No.: US 7,891,796 B2
(45) Date of Patent: Feb. 22, 2011

(54) LIQUID APPLICATION DEVICE, INKJET RECORDING APPARATUS, AND METHOD OF CONTROLLING LIQUID APPLICATION DEVICE

(75) Inventors: Atsuhiko Masuyama, Tokyo (JP); Osamu Iwasaki, Tokyo (JP); Yoshinori Nakagawa, Kawasaki (JP); Naomi Oshio, Kawasaki (JP); Naoji Otsuka, Yokohama (JP); Hitoshi Sugimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1167 days.

(21) Appl. No.: 11/549,422

(22) Filed: Oct. 13, 2006

(65) Prior Publication Data

US 2007/0070163 A1 Mar. 29, 2007

Related U.S. Application Data

(63) Continuation of application No. PCT/JP2006/315884, filed on Aug. 10, 2006.

(30) Foreign Application Priority Data

Aug. 11, 2005 (JP) ............................ 2005-233269
Dec. 1, 2005 (JP) ............................ 2005-348250

(51) Int. Cl.
*B41J 29/38* (2006.01)
*B41J 2/175* (2006.01)
*B41J 2/18* (2006.01)
*B41J 2/17* (2006.01)
*G01D 11/00* (2006.01)

(52) U.S. Cl. ............................ 347/93; 347/6; 347/85; 347/89; 347/95; 347/100

(58) Field of Classification Search .................... 347/6, 347/85, 89, 93, 95, 100
See application file for complete search history.

(56) References Cited

U.S. PATENT DOCUMENTS 6,183,079 B1 2/2001 Meade et al.

(Continued)

FOREIGN PATENT DOCUMENTS

JP 60-124672 8/1985

(Continued)

OTHER PUBLICATIONS

Translation of International Preliminary Report on Patentability, International Application No. PCT/JP2006/315884, filed on Aug. 10, 2006.

*Primary Examiner*—Matthew Luu
*Assistant Examiner*—Kendrick X Liu
(74) *Attorney, Agent, or Firm*—Fitzpatrick, Cella, Harper & Scinto

(57) ABSTRACT

The present invention provides a liquid application device, an inkjet recording apparatus and a recording apparatus, which are capable of performing an adequate application initial operation according to the length of waiting time and power-off time, as well as a method of controlling the liquid application device. In the present invention, information on an end time of the previous processing for collecting liquid is read from a nonvolatile memory, current time information indicating the current time is obtained, and information on a lapse of time from the end time of the previous collection to a start time of the current application. Thereafter, the number of preliminary rotations R of an application roller is decided based on the information on the lapse of time with reference to a look-up table. Sequentially, the application roller is rotated by the decided number of preliminary rotations R to perform preprocessing operation.

9 Claims, 34 Drawing Sheets

U.S. PATENT DOCUMENTS

| | | | | |
|---|---|---|---|---|
| 2005/0179720 | A1 | 8/2005 | Iwasaki et al. | |
| 2005/0179760 | A1* | 8/2005 | Nakagawa et al. | 347/105 |
| 2006/0176325 | A1 | 8/2006 | Seki et al. | |
| 2007/0034102 | A1 | 2/2007 | Oshio et al. | |
| 2007/0034152 | A1 | 2/2007 | Nakagawa et al. | |
| 2007/0035592 | A1 | 2/2007 | Oshio et al. | |
| 2007/0035593 | A1 | 2/2007 | Iwasaki | |
| 2007/0070163 | A1 | 3/2007 | Masuyama et al. | |
| 2007/0126835 | A1 | 6/2007 | Oshio et al. | |
| 2007/0126836 | A1 | 6/2007 | Masuyama et al. | |

FOREIGN PATENT DOCUMENTS

| | | |
|---|---|---|
| JP | 8-72227 | 3/1996 |
| JP | 2002-096452 | 4/2002 |
| JP | 2002-137378 | 5/2002 |
| JP | 2002-517341 | 6/2002 |

* cited by examiner

| ΔT | ≦60 SECONDS | ≦10 MINUTES | ≦24 HOURS | >24 HOURS |
|---|---|---|---|---|
| R [TIMES] | 0 | 3 | 10 | 100 |

FIG.19

| ΔT | ≦60 SECONDS | ≦10 MINUTES | ≦24 HOURS | >24 HOURS |
|---|---|---|---|---|
| R [TIMES] | 0 | 3 | 1 0 | PRELIMINARY ROTATION AND COLLECTION |

FIG.20

LIQUID APPLICATION DEVICE, INKJET RECORDING APPARATUS, AND METHOD OF CONTROLLING LIQUID APPLICATION DEVICE

BACKGROUND OF THE INVENTION

1. Field of the Invention

The present invention relates to a liquid application device and an inkjet recording apparatus. Particularly, the present invention relates to a liquid application device, an ink jet recording apparatus each applying liquid to a medium for a certain purpose which is, for example, to promote the aggregation of pigment when recording is carried out by using ink containing the pigment as a coloring material. In addition the present invention relates to a method of controlling the liquid application device.

2. Description of the Related Art

As for an ink jet recording apparatus such as a printer, it is generally known that treatment liquid insolubilizing or coagulating coloring material of ink is used to improve recording quality such as bleeding, density, color tone, offset and the like, and robustness of the image such as waterproof and antiweatherability.

One of methods of applying the treatment liquid to a recording medium is that the treatment liquid is ejected to the recording medium with a recording head in the same manner as the ink is ejected. However, in this method, because mists of treatment liquid are generated by the ejection, it is possible to generate clogging of nozzles caused by the mists of treatment liquid. Moreover, in order to eject the treatment liquid stably form the recording head, many constraints are generated for the viscosity of the treatment liquid, the surface tension, the composition of solution, and the like.

In contrast, a method is known of applying the treatment liquid to the entire recoding medium with rollers. FIG. 34 is a cross sectional view showing a main part of a treatment liquid application mechanism using this method. In this figure, a recording medium 63 is wound, by a press chuck 62, around a platen roller 61 rotated by a motor (not shown). In addition, treatment liquid 65 is contained in a coating unit 64. By means of an agitating and supplying roller 65, the treatment liquid 65 is agitated and supplied to transport and film thinning roller 68. Then, the transport and film thinning rollers 67 and 68 form the treatment liquid 65 into a thin film on a roller surface of an application roller 69. The application roller 69 rotates while pressing onto the recording medium 63 wound around the rotating platen roller 61, and applies the treatment liquid 65 to the surface of the recording medium 63. At the same time, a recording head 70 performs recoding by ejecting ink onto the surface of the recording medium 63 to which the treatment liquid 65 has been applied. As mentioned above, by means of the method of applying the treatment liquid in advance by using the application roller, liquid with relatively high viscosity can be thinly applied without causing mists of treatment liquid to generate, as compared with the method of ejecting the treatment liquid by using the recording head.

In addition, as for a liquid application mechanism which applies application liquid such as treatment liquid to a medium with the rotation of a roller, one described in Japanese Patent Application Publication No. 2002-517341 is known. In Japanese Patent Application Publication No. 2002-517341, a doctor blade contacting with a roller is used to cause coating liquid to be stored between the doctor blade and the roller, and the coating liquid is applied to the roller as the roller rotates. Then, as the roller rotates, the applied coating liquid is transferred and applied to a support medium transferred between this roller and another roller. Likewise, in Japanese Patent Application Laid-open No. Hei 8-72227, described is a liquid application mechanism applying treatment liquid insolubilizing dyestuffs before recording.

In the aforementioned liquid application mechanism, since the application roller is exposed to the air in a state where no fresh treatment liquid is supplied thereto while the application operation is not performed, the treatment liquid remaining on the surface of the application roller is thickened. The longer the application operation is out of service, the larger a degree of increase in viscosity of the treatment liquid becomes. In other words, if a relatively long time passes in a state where the treatment liquid adheres to the application roller, viscosity of the treatment liquid rises due to vaporization of a solvent such as water in the treatment liquid. When the application operation is performed in this state where the viscosity has been increased like this, the rollers cannot rotate well and an appropriate amount of application liquid is not supplied to the roller. Accordingly, the problem arises that application to the recording medium cannot be satisfactorily performed.

Needless to say, the aforementioned problem does not arise only in the application mechanism with the configuration shown in FIG. 34. It is the matter of course that there exist various portions in contact with the treatment liquid between the portion where the treatment liquid is stored and the application roller in the case of the configurations in FIGS. 11, 21, 27, and 30 to be described later. This is the case with most of the configurations which apply the treatment liquid by using the application roller. In these portions in contact with the treatment liquid, the problem arises due to the aforementioned thickening of the treatment liquid. For example, an application mechanism is also known in which the treatment liquid retained in a space formed by causing a part of a liquid retention member to abut on an application roller, is applied to a medium via the application roller. In this mechanism, the treatment liquid, which exists in not only the application roller, but also the liquid retention member and the portion where the retention member abuts on the application roller, also thickens. This sometimes causes the same problem as mentioned above.

In order to solve the aforementioned problem, it is known that application initial operation is performed in advance before an application operation accompanying recording (see Japanese Patent Application Laid-open No. 2002-96452). This indicates that the treatment liquid-application operation is performed without recording medium periodically during a waiting time for the recording operation (namely, during a time not in the application operation). That is, the respective rollers, including the application roller, to which the treatment liquid adheres, are driven to be rotated and the treatment liquid is supplied to the surfaces of these rollers to cause a flow of the treatment liquid. In Japanese Patent Application Laid-open No. 2002-96452, the application initial operation is performed when an apparatus is powered on (apparatus start-up time). The above-mentioned application initial operation circulates the treatment liquid on the surfaces of the application roller and the like, to cause the viscosity of the treatment liquid on the respective rollers to return to a normal value, and to make an application condition be in a state that the application roller is caused to satisfactorily perform the application operation.

In the construction which performs the application initial operation periodically during the waiting time for recording, however, in some cases, particularly, home users are nervous about noise and receive an uncomfortable feeling.

In Japanese Patent Application Laid-open No. 2000-96452, as described above, not only the application initial operation is performed in order to deal with thickening of the treatment liquid during the waiting time for recording in a power-on state, but also the application initial operation is performed just after power is turned on, in order to deal with thickening of the treatment liquid in a power-off state. There is a difference in degrees of sticking of the treatment liquid to the application roller between the case when the power is off for a long time and the case when the power is off for a relative short time. Accordingly, the application initial operation in accordance with the length of time for power-off should be performed. However, In Japanese Patent Application Laid-open No. 2002-96452, the application initial operation in accordance with the length of time for power-off dose not performed. That is, In Japanese Patent Application Laid-open No. 2002-96452, a rotating time of the application roller at the time of the return operation is set constant regardless of an elapse of time between the previous power-off and the current power-on. Accordingly, when the lapse of time is long, the viscosity of the treatment liquid on the application roller cannot be sufficiently returned only for the rotating time in some cases. On the other hand, when the lapse of time is short, the viscosity of the treatment liquid on the application roller can be sufficiently returned even though the return operation is performed for a time less than the rotating time. Therefore, in this case, the apparatus start-up is delayed by the excessive rotating time.

In the case of Japanese Patent Application No. 2002-96452, as mentioned above, the processing for reducing the viscosity of the treatment liquid (viscosity reduction processing of treatment liquid) stuck to the application roller and the like is not performed with no consideration given to the length of time during which the viscosity of the treatment liquid increases (or a degree of thickening of the treatment liquid).

SUMMARY OF THE INVENTION

An object of the present invention is to provide a liquid application device, and an inkjet recording apparatus each being capable of performing an appropriate viscosity reduction processing of a treatment liquid, with consideration given to the length of time during which the viscosity of the treatment liquid increases.

Moreover, another object of the present invention is to provide a liquid application device, and an inkjet recording apparatus each being capable of minimizing a driving time for reducing thickened matter stuck to a surface of an application roller, and a method of controlling the liquid application device control.

In a first aspect of the present invention, a liquid application device comprises: liquid applying means including an application member for applying liquid to a medium, wherein the liquid applying means applies the liquid to the medium by rotation of the application member; obtaining means for obtaining information relating to a period which passes after a processing associated with a previous liquid application by the liquid application means is completed; and processing means for controlling a processing for reducing the viscosity of the liquid stuck to the application member based on the information obtained by the obtaining means.

In second aspect of the present invention, a liquid application device comprises: liquid applying means which includes an application member for applying liquid to a medium and a liquid retention member for retaining the liquid in a state that the liquid is in contact with a part of the application member, and which applies the liquid retained by the liquid retention member to the medium with the application member by rotating the application member; obtaining means for obtaining information relating to period in which a rise of the viscosity of the liquid on the application member is generated; and processing means for controlling a processing for causing an entire surface of the application member to be in contact with liquid retained in the liquid retention space, at least once, based on the information obtained by the obtaining means.

In third aspect of the present invention, a liquid application device comprises: liquid applying means which includes an application member for applying liquid to a medium and a liquid retention member for retaining the liquid in a state that the liquid is in contact with apart of the application member, and which applies the liquid retained by the liquid retention member to the medium with the application member by rotating the application member; obtaining means for obtaining information relating to a period which passes after a processing associated with a previous liquid application by the liquid application means is completed; and processing means for performing processing for causing the application member to rotate, wherein the number or time of rotations of the application member by the processing means is decided based on the information obtained by the obtaining means.

In fourth aspect of the present invention, an ink jet recording apparatus comprises: the liquid application device according to claim 1; and recording means which records an image on a medium by discharging ink from a recording head to the medium to which the liquid is applied by the liquid application device.

In fifth aspect of the present invention, a method of controlling a liquid application device which includes an application member for applying liquid to a medium, and which applies the liquid to the medium by rotating the application member, the method comprises the steps of: obtaining information relating to a period which passes after a processing associated with a previous liquid application by the liquid application means is completed; and rotating the application member based on the information obtained by the obtaining step.

In sixth aspect of the present invention, a method of controlling a liquid application device which includes an application member for applying liquid to a medium, and which applies the liquid to the medium by rotating the application member, the method comprises the steps of: obtaining information on a period during which viscosity of the liquid on the application member increases; and controlling processing for reducing the viscosity of the liquid stuck to the application member based on the information obtained by the obtaining step.

The above configuration makes it possible to perform the processing for reducing the viscosity of the treatment liquid on the application member (the treatment liquid viscosity reduction processing), depending on the length of time during which the viscosity of the treatment liquid increases as well as on the degree of thickening of the treatment liquid. Accordingly, a time for performing the treatment liquid viscosity reduction processing can be reduced to the minimum necessary.

Further features of the present invention will become apparent from the following description of exemplary embodiments (with reference to the attached drawings).

BRIEF DESCRIPTION OF THE DRAWINGS

FIG. 19 is a diagram showing a relationship for deciding an application roller preliminary rotation time in the first embodiment of the present invention;

FIG. 20 is a diagram showing a relationship for deciding an application roller preliminary rotation time in the second embodiment of the present invention;

DESCRIPTION OF THE EMBODIMENTS

Detailed description will be given below of preferred embodiments of the present invention with reference to the accompanying drawings.

In an embodiment of the present invention, in an ink jet recording apparatus and other recording apparatus which include an application mechanism for applying liquid such as application liquid to an application medium (a recording medium), a suitable preprocessing operation at the time which the application mechanism is not in operation (which is also called an application initial operation) is performed. The application mechanism may be a mechanism having a liquid retention space as explained in first to fifth embodiments or a mechanism in which application liquid stored in an application liquid tank is exposed to air as explained in sixth and seventh embodiments.

As is obvious from each of the embodiments to be described later, the present invention is characterized by controlling processing for reducing viscosity of the treatment liquid on the application member (treatment liquid viscosity reduction processing) depending on the length of a time during which the viscosity of the treatment liquid on the application member increases.

Here, the phrase reading "the length of time during which the viscosity of the treatment liquid increases" indicates a time which passes after the previous processing associated with the liquid application is completed. Hereinafter, this is called as "a lapse of time" or "a waiting time."

In the present specification, "the time which passes after the previous processing associated with the liquid application is completed" includes at least the following times (A) to (F).

(A) A lapse of time between the completion of the pervious collection operation and the start of the current application operation;

(B) A lapse of time between the completion of the pervious rotation operation and the start of the current application operation;

(C) A lapse of time between the completion of the pervious application operation and the start of the current application operation;

(D) A lapse of time between the completion of the pervious collection operation and power-on;

(E) A lapse of time between the completion of the pervious rotation operation and power-on; and (F) A lapse of time between the completion of the pervious application operation and power-on.

Moreover, "the start of the current application operation" includes, for example, a time when a pump starts to be driven, a time when an application roller starts to be rotated, or a time when a recording start instruction is inputted.

Furthermore, "viscosity reduction processing of treatment liquid" indicates "preprocessing" which includes, for example, processing for rotating the application member or processing for sliding the application member.

FIRST EMBODIMENT

Figure 1:
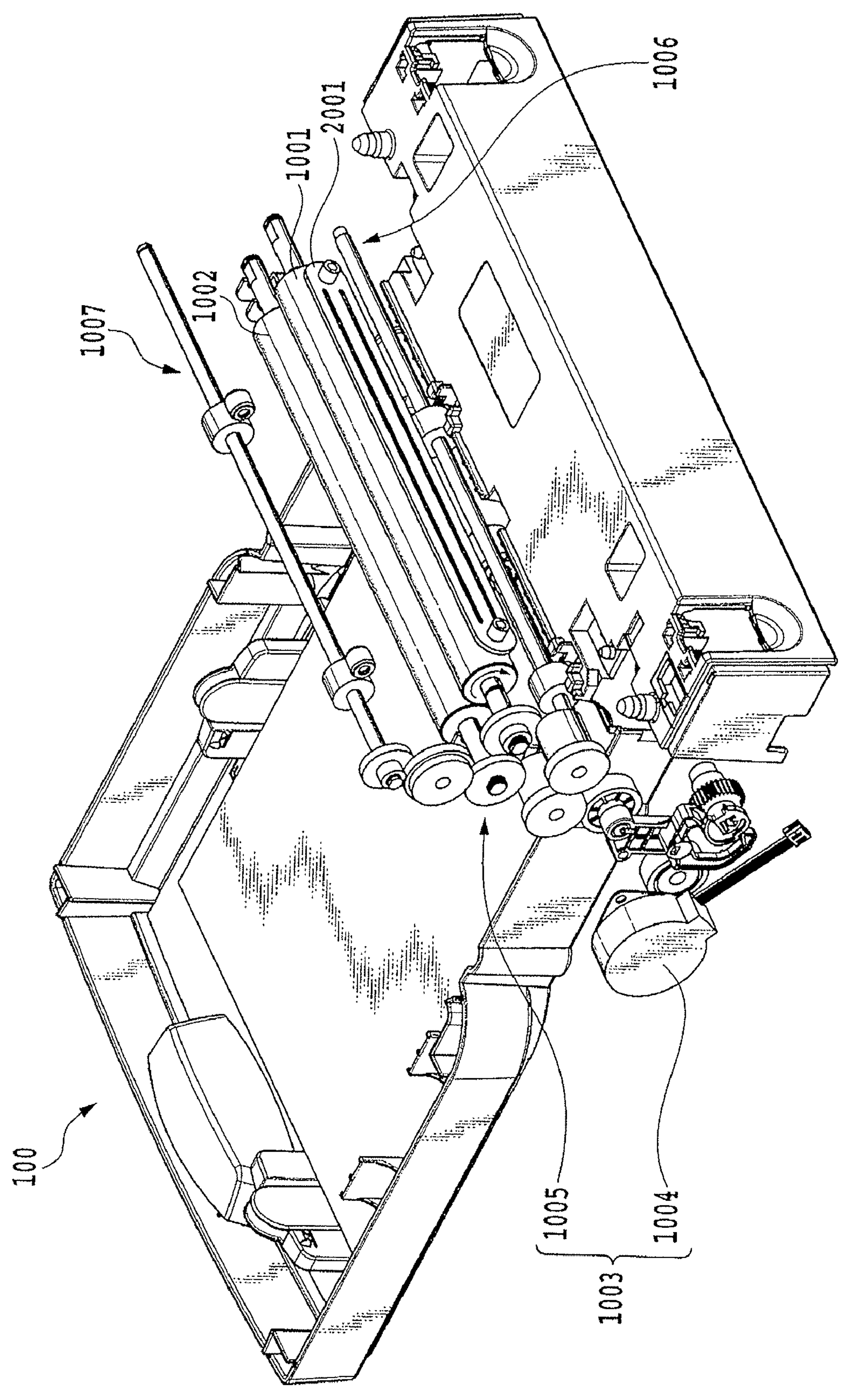
FIG. 1 is a perspective view showing an overall construction of an embodiment of a liquid application device of the present invention.

FIG. 1 is a perspective view showing an overall structure of the embodiment of a liquid application device 100 of the present invention. The liquid application device 100 shown here generally includes liquid application means for applying a predetermined application liquid to a medium (hereinafter also referred to as the application medium) which is an object to which the liquid is applied and liquid supply means for supplying the application liquid to the liquid application means.

The liquid application means includes a cylindrical application roller 1001, a cylindrical counter roller (a medium supporting member) 1002 placed so as to face the application roller 1001 and a roller drive mechanism 1003 driving the application roller 1001. The roller drive mechanism 1003 includes a roller drive motor 1004 and a power transmission mechanism 1005 including a gear train for transmitting the driving force of the roller drive motor 1004 to the application roller 1001.

The liquid supply means includes a liquid retention member 2001 retaining the application liquid between itself and a circumferential surface of the application roller 1001, and a liquid channel 3000 (not shown in FIG. 1), to be described later, supplying the liquid to the liquid retention member 2001. The application roller 1001 and the counter roller 1002 are freely rotatably supported individually by parallel shafts, each of which has both ends thereof freely rotatably fitted to a frame not shown. The liquid retention member 2001 extends substantially over the entire length of the application roller 1001, and is movably mounted to the frame via a mechanism which enables the liquid retention member 2001 to come into contact with or to separate from the circumferential surface of the application roller 1001.

The liquid application device of this embodiment further includes an application medium feeding mechanism 1006 for transferring the application medium to a nip area between the application roller 1001 and the counter roller 1002, the application medium feeding mechanism 1006 being constituted of a pickup roller and other elements. In a transfer path of the application media, a sheet discharging mechanism 1007 transferring, to a sheet discharging unit (not shown), the application medium to which the application liquid has been applied is provided downstream of the application roller 1001 and the counter roller 1002, the sheet discharging mechanism 1007 having a sheet discharging roller and other elements. As in the case of the application roller and the like, these paper feeding mechanism and the sheet discharging mechanism are operated by the driving force of the drive motor 1004 transmitted via the power transmission mechanism 1005.

It should be noted that the application liquid used in this embodiment is a liquid used for the purpose of advancing the start of the coagulation of pigment when recording is carried out using an ink which contains pigment as a coloring material.

An example of components of the application liquid is described below.

| | |
|---|---|
| calcium nitrate tetrahydrate | 10% |
| glycerin | 42% |
| surface-active agent | 1% |
| water | the rest |

The viscosity of the application liquid is from 5 to 6 cP (centipoises) at 25° C.

Needless to say, in application of the present invention, the application liquid is not limited to the above liquid. As another application liquid, for example, a liquid which contains a component insolubilizing the dye or causing the coagulation of the dye, can be used. As yet another application liquid, a liquid which contains a component suppressing curling of the application media (the phenomenon that the media take a curved shape), can be used.

In a case where water is used in the applied liquid, the sliding property at the contact area of the liquid retention member with the application roller of the present invention will be improved by mixing a component reducing the surface tension with the liquid. In the above example of the components of the applied liquid, glycerin and the surface-active agent are the components reducing the surface tension of water.

More detailed description will now be given of construction of each portion.

Figure 2:
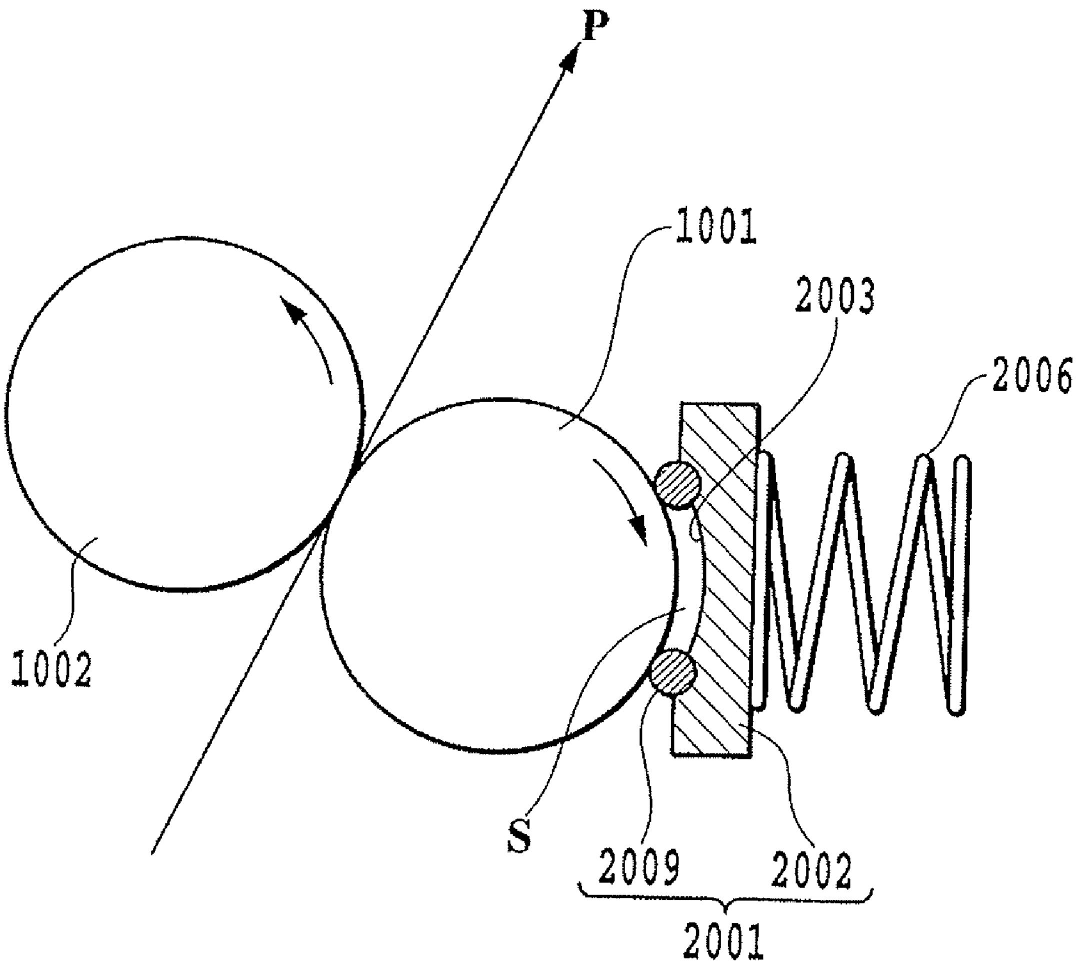
FIG. 2 is a longitudinal sectional side view showing an example of an arrangement of elements including an application roller, a counter roller and a liquid retention member.

FIG. 2 is an explanatory longitudinal sectional side view showing an example of an arrangement of elements including the application roller 1001, the counter roller 1002 and the liquid retention member 2001.

The counter roller 1002 is biased toward the circumferential surface of the application roller 1001 by bias means not shown, and rotates the application roller 1001 clockwise in the figure. This rotation makes it possible to hold, between both rollers, the application medium P to which the application liquid is applied, and to transfer the application medium P in the direction indicated by the arrow in the figure.

The liquid retention member 2001 is designed to create an elongated liquid retention space S extending across a liquid application region of the application roller 1001 while the liquid retention member 2001 abuts on the circumferential surface of the application roller 1001, biased thereto by the bias force of a spring member (pressing means) 2006. The application liquid is supplied from the below-described liquid channel 3000 into the liquid retention space S through the liquid retention member 2001. In this case, since the liquid retention member 2001 is constructed as described below, it is possible to prevent the application liquid from accidentally leaking out of the liquid retention space S while the application roller 1001 is stopped.

A construction of the liquid retention member 2001 is shown in FIGS. 3 to 8.

Figure 3:
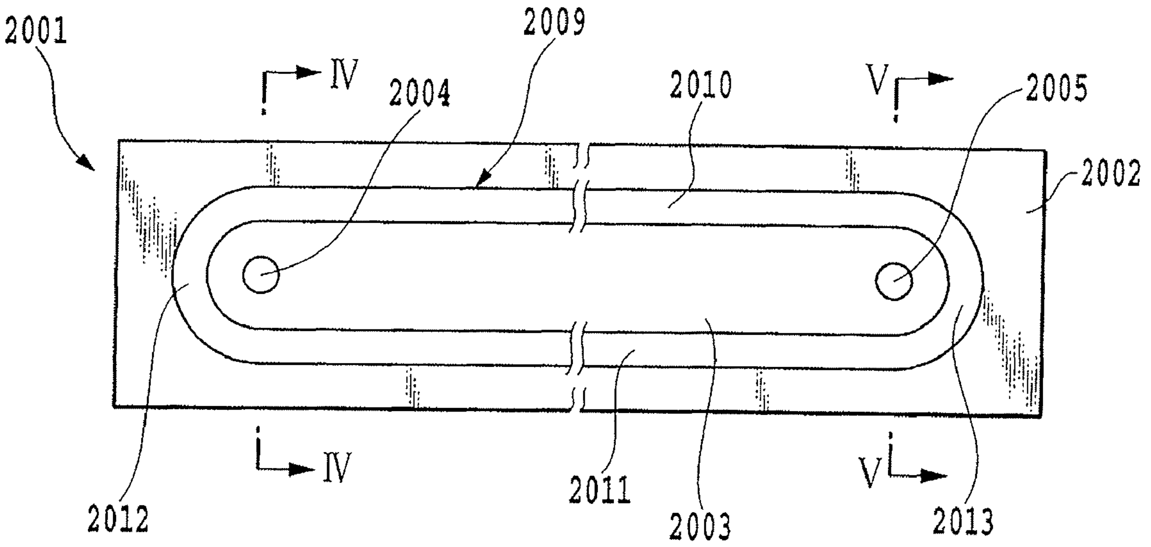
FIG. 3 is a front view of the liquid retention member shown in FIGS. 1 and 2.

As shown in FIG. 3, the liquid retention member 2001 includes a space creating base 2002 and an annular contact member 2009 provided on one surface of the space creating base 2002 in a protruding manner. In the space creating base 2002, a concave portion 2003, a bottom portion of which has a circular-arc cross section, is formed in the middle thereof along the longitudinal direction. Each straight portion of the contact member 2009 is fixedly attached to the space creating base 2002 along the edge portion of the concave portion 2003, and each circumferential portion thereof is fixedly attached to the space creating base 2002 so as to run from one edge portion to the other edge portion via the bottom portion. In this way, when abutting on the application roller 1001, the contact member 2009 of the liquid retention member 2001 can abut thereon in conformity with the shape of the circumferential surface of the application roller, which realizes the abutting with a uniform pressure.

As described above, with regard to the liquid retention member in this embodiment, the seamless contact member 2009 formed in one body is caused to abut on the outer circumferential surface of the application roller 1001 consecutively with no space therebetween by the bias force of the spring member 2006. As a result, the liquid retention space S becomes a substantially closed space defined by the contact member 2009, one surface of the space creating base and the outer circumferential surface of the application roller 1001, and the liquid is retained in this space. Thus, while the rotation of the application roller 1001 is stopped, the contact member 2009 and the outer circumferential surface of the application roller 1001 can keep a fluid-tight state, and can surely prevent the liquid from leaking out. On the other hand, when the application roller 1001 rotates, as described later, the application liquid passes through the interface between the outer circumferential surface of the application roller 1001 and the contact member 2009, and adheres to the outer circumferential surface of the application roller 1001 in a form of a film. "While the application roller 1001 is stopped, the outer circumferential surface thereof and the contact member 2009 are in a fluid-tight state" means that, as described above, the liquid is not allowed to pass through the boundary between the inside and the outside of the space. In this case, the abutting condition of the contact member 2009 includes a condition where the contact member 2009 abuts on the outer circumferential surface of the application roller 1001 with a film of the liquid, which is formed by the capillary action, interposed therebetween, as well as a condition where the contact member 2009 directly abuts on the outer circumferential surface of the application roller 1001.

Figure 4:
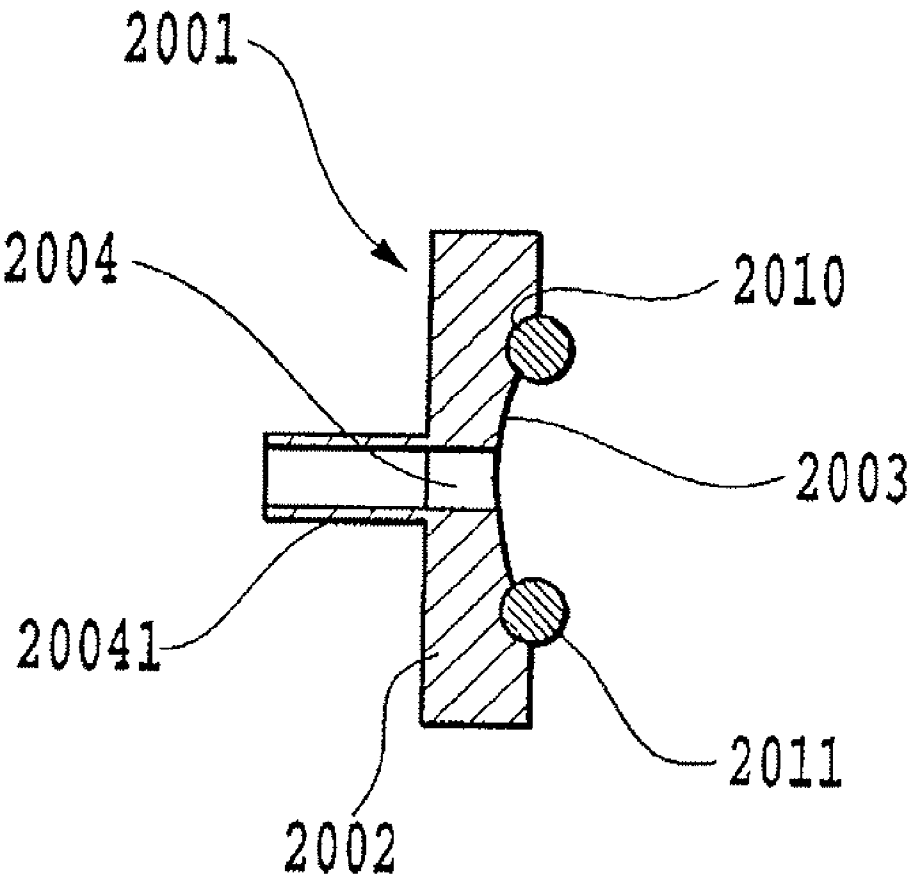
FIG. 4 is an end view showing an end obtained by cutting the liquid retention member shown in FIG. 3 along the line IV-IV.
Figure 5:
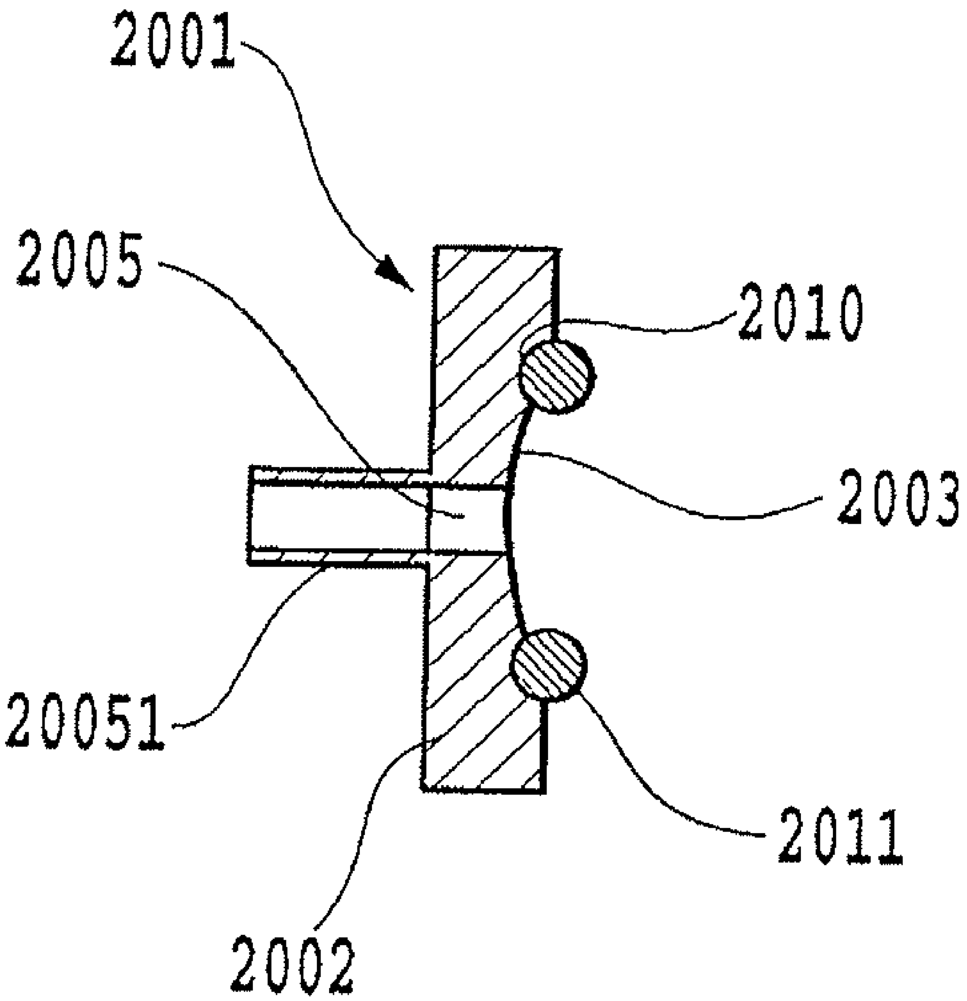
FIG. 5 is an end view showing an end obtained by cutting the liquid retention member shown in FIG. 3 along the line V-V.
Figure 6:
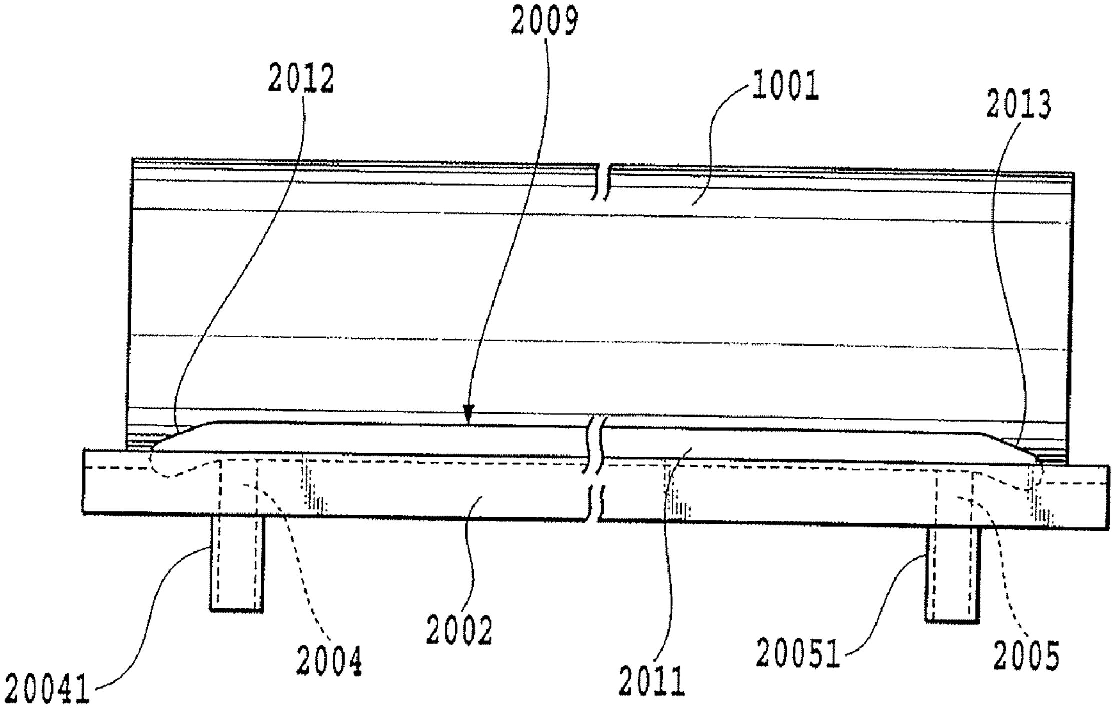
FIG. 6 is a plan view of the liquid retention member shown in FIG. 3.
Figure 7:
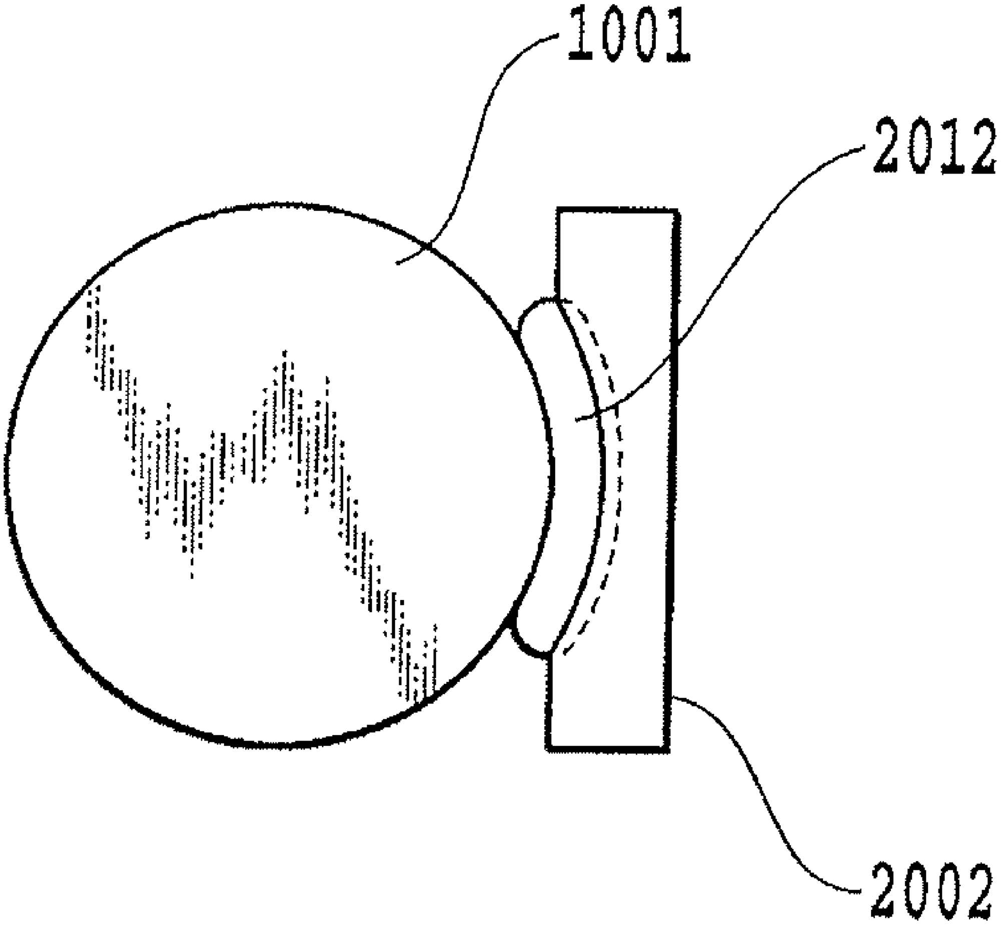
FIG. 7 is a left side view showing a state where a contact portion of the liquid retention member shown in FIG. 3 is allowed to abut on the liquid application roller.
Figure 8:
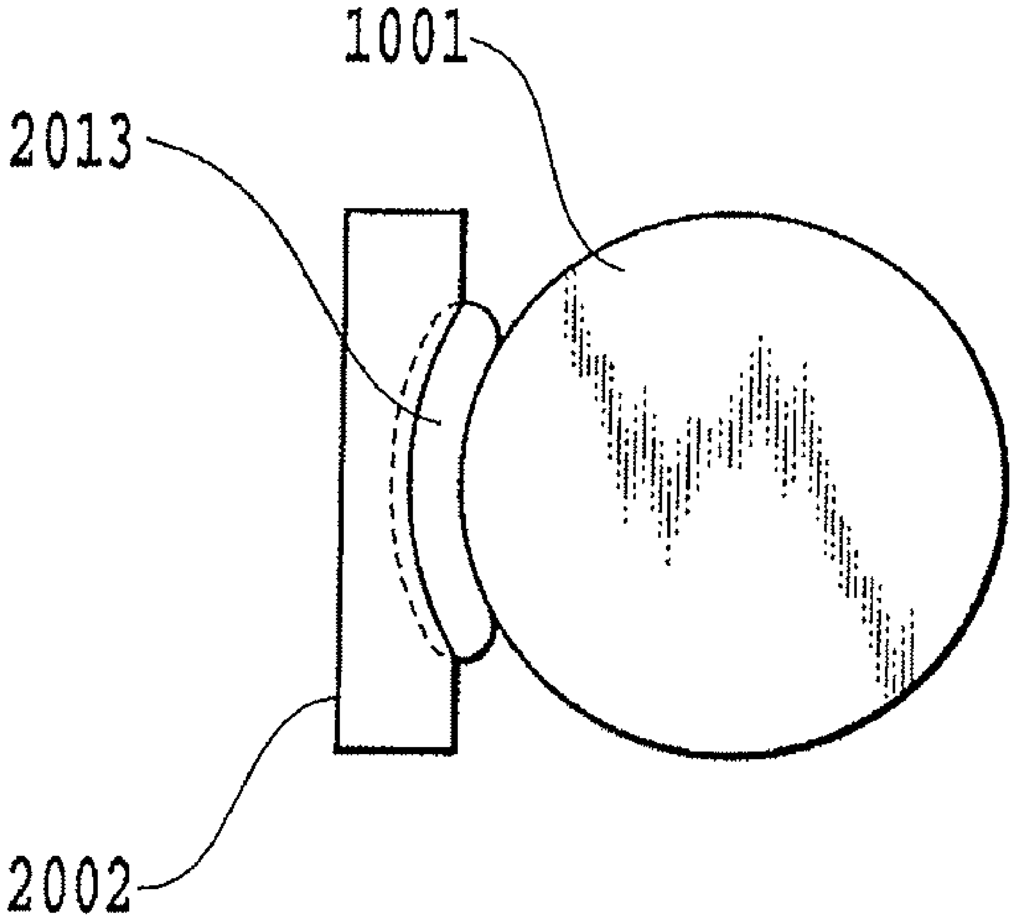
FIG. 8 is a right side view showing a state where the contact portion of the liquid retention member shown in FIG. 3 is allowed to abut on the liquid application roller.

The left and right end portions of the contact member 2009 in the longitudinal direction have a gently curved shape when viewed from any one of the front thereof (FIG. 3), the top thereof (FIG. 6), and a side thereof (FIGS. 7 and 8), as shown in FIGS. 3 to 8. As a result, even when the contact member 2009 is allowed to abut on the application roller 1001 with a relatively high pressure, the whole contact member 2009 is elastically deformed substantially uniformly, and local large deformation does not occur. Thus, the contact member 2009 abuts on the outer circumferential surface of the application roller 1001 consecutively with no space therebetween, and can create the substantially closed space, as shown in FIGS. 6 to 8.

On the other hand, as shown in FIGS. 3 to 5, the space creating base 2002 is provided with a liquid supply port 2004 and a liquid collection port 2005 in the region surrounded by the contact member 2009, each port being formed by making a hole penetrating the space creating base 2002. These ports communicate with cylindrical joint portions 20041 and 20051, respectively, which are provided on a back side of the space creating base in a protruding manner. The joint portions 20041 and 20051 are in turn connected to the below-described liquid channel 3000. In this embodiment, the liquid supply port 2004 is formed near one end portion (the left end portion in FIG. 3) of the region surrounded by the contact member 2009, and the liquid collection port 2005 is provided near the other end portion (the right end portion in FIG. 3) of the same region. The liquid supply port and the liquid collection port are not limited by the above configuration, and may be formed at any location in the space creating base. In addition, the number of the liquid supply ports and the number of the liquid collection ports may be arbitrary. The liquid supply port 2004 is used to supply, to the above-described liquid retention space S, the application liquid supplied from the liquid channel 3000. The liquid collection port 2005 is used to allow the liquid in the liquid retention space S to flow out to the liquid channel 3000. By supplying the liquid and allowing the liquid to flow out, the application liquid is caused to flow from the left end portion to the right end portion in the liquid retention space S.

(Application Liquid Channel)

Figure 11:
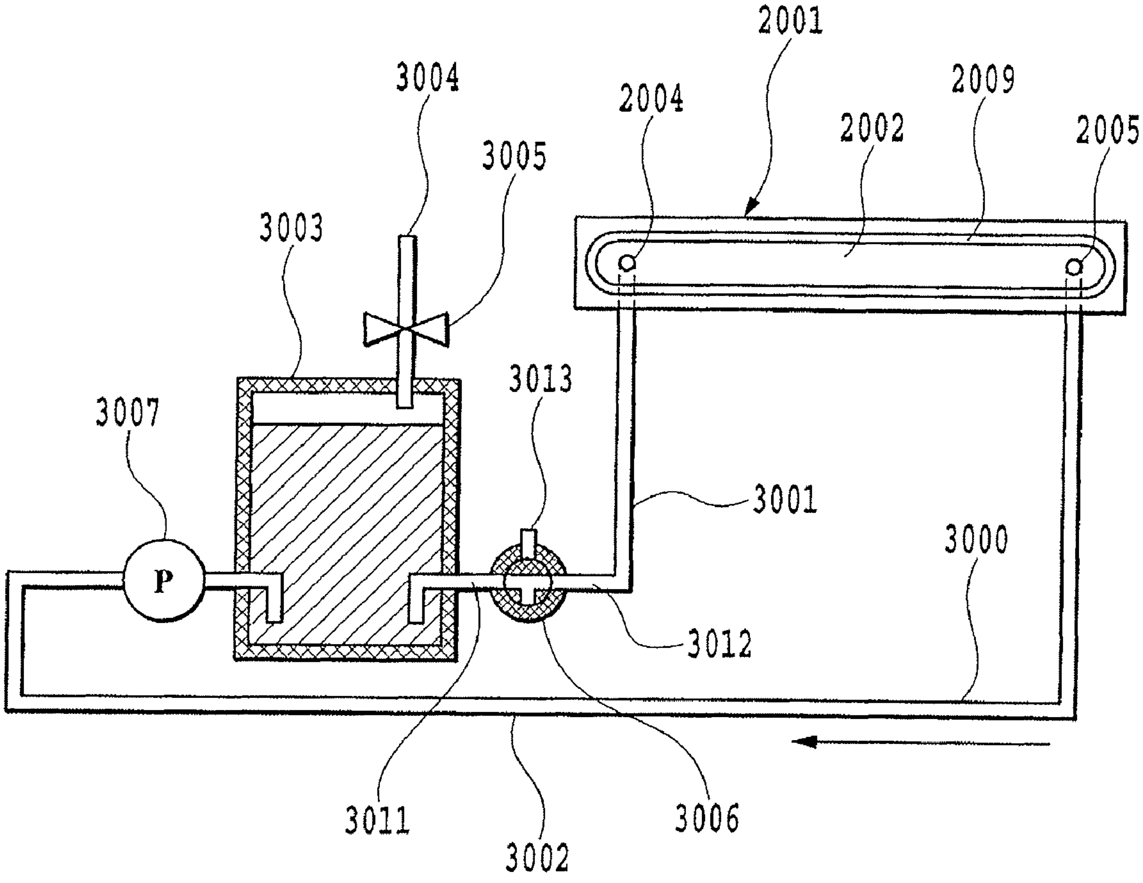
FIG. 11 is a diagram showing a schematic configuration of a liquid channel of the liquid application device in the embodiment of the present invention.

FIG. 11 is an explanatory diagram showing a schematic configuration of the liquid channel 3000 connected to the liquid retention member 2001 of the application liquid supply means.

The liquid channel 3000 has a first channel 3001 which connects the liquid supply port 2004 of the space creating base 2002 being an element of the liquid retention member 2001, and a storage tank 3003 storing the application liquid. In addition, the liquid channel 3000 has a second channel 3002 which connects the liquid collection port 2005 of the space creating base 2002 and the storage tank 3003. This storage tank 3003 is provided with an atmosphere communication port 3004, and the atmosphere communication port is provided with an atmosphere communication valve 3005 switching between an atmosphere communicating state and an atmosphere isolation state. The atmosphere communication port 3004 preferably has a labyrinth structure in order to suppress vaporization. In addition, a switching valve 3006 is provided in the first channel 3001, making it possible to switch between the state where the first channel 3001 and the atmosphere communicate with each other and the state where these are isolated from each other. In the second channel 3002, a pump 3007 is connected, which is used to force the application liquid and air to flow in a desired direction in the liquid channel 3000. In this embodiment, the pump 3007 causes the liquid to flow in the direction from the first channel 3001 to the second channel 3002 via the liquid retention space S.

In this embodiment, the first and second channels 3001 and 3002 are formed of circular tubes. Openings formed at respective ends of the tubes are located at or near the bottom of the storage tank 3003, so that the application liquid in the storage tank 3003 can be completely consumed.

For the switching valve 3006 in this embodiment, various kinds of valves can be used as long as the valve can switch between the state where the first channel 3001 and the atmosphere communicate with each other and the state where these are isolated from each other. In this embodiment, however, a three-way valve as shown in FIG. 11 is used. The three-way valve 3006 has three ports communicating with each other. The three-way valve 3006 can allow two of these ports to selectively communicate with two of a storage-tank side tube 3011, a liquid-retention-member side tube 3012 and an atmosphere communication port 3013 in the first channel 3001. The switching of this three-way valve 3006 allows for the selective switching between a connection state where the tubes 3011 and 3012 are allowed to communicate with each other and a connection state where the tube 3012 and the atmosphere communication port 3013 are allowed to communicate with each other. In this way, it is made possible to selectively supply, to the liquid retention space S created by the liquid retention member 2001 and the application roller 1001, the application liquid in the storage tank 3003 or the air taken in from the atmosphere communication port 3013. The switching of the three-way valve 3006 is performed in accordance with a control signal from a below-described control unit 4000, so that the filling or the supply of the application liquid is performed.

(Control System)

Figure 12:
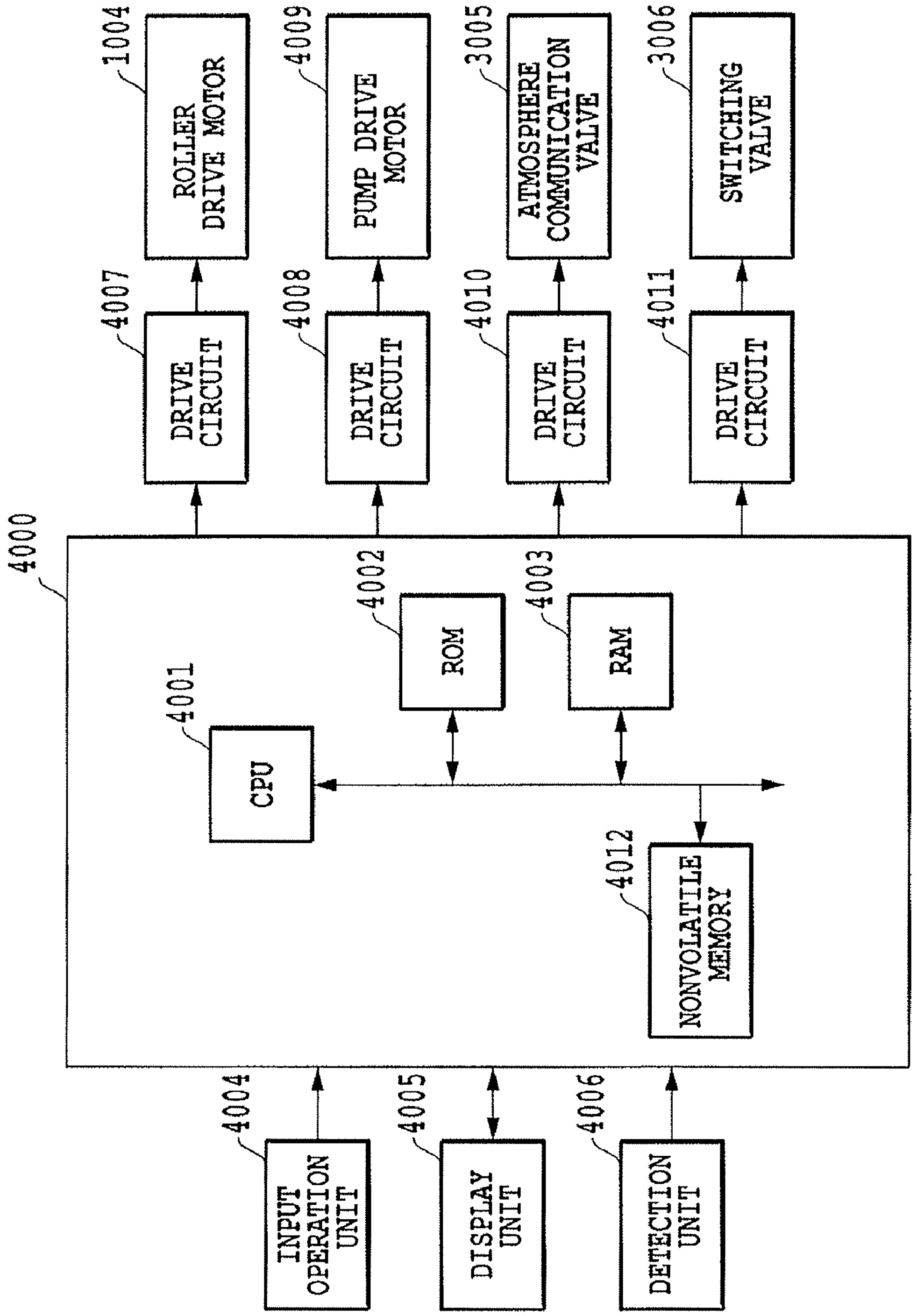
FIG. 12 is a block diagram showing a schematic configuration of a control system in the embodiment of the present invention.

FIG. 12 is a block diagram showing a schematic configuration of a control system in a liquid application device of this embodiment.

In FIG. 12, reference numeral 4000 denotes a control unit as control means which controls the whole liquid application device. This control unit 4000 includes a CPU 4001 performing various processing such as computation, control, and determination. Moreover, the control unit 4000 includes a ROM 4002 storing a control program for processing executed by a CPU 4001 as described later in FIGS. 13 to 18, and a look-up table as described later in FIGS. 19 and 20. The control unit 4000 further includes a RAM 4003 which temporarily stores input data and data generated during processing of the CPU 4001, and a nonvolatile memory 4012 such as a flash memory, SPAM and the like.

This control unit 4000 has a function of acquiring information indicating a lapse of time as described later, and a function of controlling a preprocessing operation based on the information indicating the lapse of time.

An input operation unit 4004 including a keyboard or various switches with which a predetermined command, data or the like is inputted, and a display unit 4005 displaying various information, such as input, settings, or the like of the liquid application device, are connected to the control unit 4000. In addition, a detection unit 4006 including a sensor for detecting the position of an application medium, the operation condition of each portion, or the like, is connected to the control unit 4000. Moreover, the roller drive motor 1004, a pump drive motor 4009, the atmosphere communication valve 3005 and the switching valve 3006 are connected to the control unit 4000 via drive circuits 4007, 4008, 4010 and 4011, respectively.

(Liquid-Application Operation Sequence)

Figure 13:
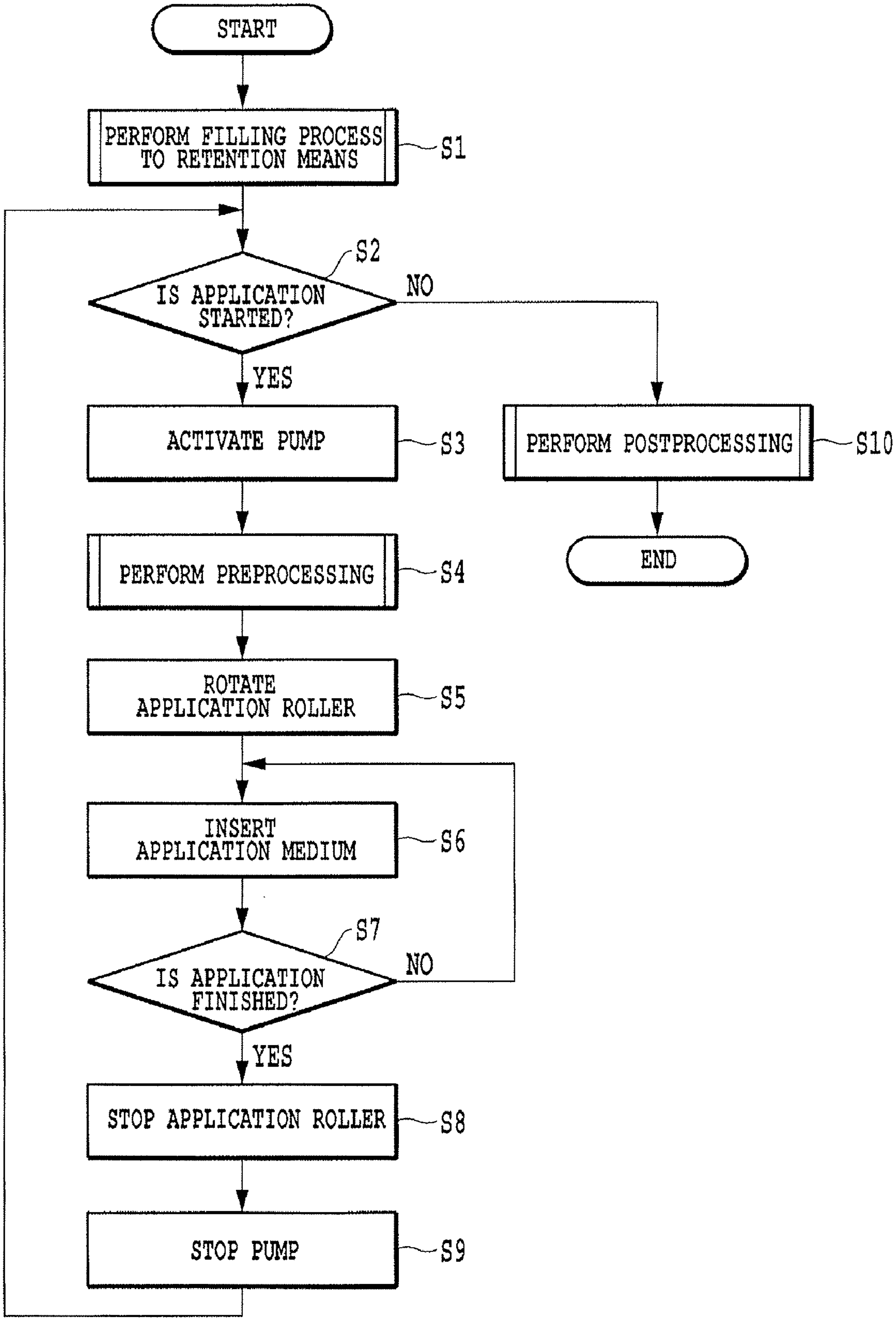
FIG. 13 is a flow chart showing a liquid-application operation sequence in the embodiment of the present invention.

FIG. 13 is a flow chart showing a processing procedure of the liquid application in the liquid application device of this embodiment. Hereinbelow, description will be given of each of steps of the liquid application with reference to this flow chart.

Once the liquid application device is turned on, the control unit 4000 carries out the following application operation sequence in accordance with the flow chart shown in FIG. 13.

(Filling Step)

In step S1, a step of filling the application liquid into the liquid retention space S is performed. In this filling step, first of all, the atmosphere communication valve 3005 of the storage tank 3003 is opened to the atmosphere, and, at the same time, the pump 3007 is driven during a certain period of time. Thus, if the liquid retention space S, and the channels 3001 and 3002 are not filled with the application liquid, the inside air is sent to the storage tank 3003 with the pump and discharged to the atmosphere, and, at the same time, the application liquid is filled into the respective portions. If the respective portions are already filled with the application liquid, the application liquid in the respective portions flows to cause application liquid having a proper concentration and viscosity to be supplied. This initial operation results in a state where the application liquid is supplied to the application roller 1001, thus making it possible to apply the liquid to an application medium.

(Application Step)

When an application start command is inputted (step S2), the pump 3007 is started to be activated again (step S3) and the application liquid is circulated between the storage tank 3003 and the liquid retention member 2001 through the application liquid channels. After that, preprocessing which will be described later is performed (step S4) to mitigate or avoid the influence of thickening or sticking of the liquid remaining on the surface of the application roller 1001. When the preprocessing is completed in step S4, the application roller 1001 is once stopped.

It should be noted that "thickening of liquid" means that a solvent or water vaporizes from liquid with a predetermined composition such as paste, gel, or solid material to cause viscosity of the liquid to become higher, that is, the liquid comes to have higher viscosity than the liquid contained in the liquid storage tank. "Thickening of liquid" further means a state where the viscosity of the liquid is made higher by the reduction in temperature, and a state, derived from a difference in coagulation point, where one of the components of the liquid, each of which has a different coagulation point from those of the others, is coagulated around the coagulation point of the component. In addition, "Sticking of liquid" means a state where the viscosity thereof becomes much higher than the above liquid viscosity.

While the "thickened matter" indicates one formed of the liquid thickened and turned into the pasty or gel state, and the "sticking matter" indicates one with a viscosity further increased from the viscosity of a thickened matter. Namely, the thickened matter is one which is formed when the liquid remaining on the surface of the application roller in the previous application operation is thickened by water vaporization resulting from the fact that the liquid remains unused for a long time. The sticking matter is one which is formed when the viscosity is more increased than that of the thickened matter.

Additionally, in this specification, the "preprocessing" is processing for reducing the viscosity of the treatment liquid stuck to the surface of the application roller (viscosity reduction processing) during a time between the completion of the processing associated with the previous liquid application and the start of the processing associated with the current liquid application. Thus, in this specification, the "preprocessing" is processing for reducing or removing the thickened matter and sticking matter formed on the surface of the application roller. The preprocessing includes processing associated with preprocessing operations such as a preliminary rotation of the application roller 1001 and determination on whether the preliminary rotation should be performed. The execution of such preprocessing makes it possible to reduce the thickened matter and sticking matter formed on the surface of the application roller 1001. In addition, it is possible to improve uniformity of a surface characteristic such as wettability over the entire surface of the application roller 1001.

Additionally, in this specification, the "preprocessing operation" denotes an operation performing the viscosity reduction processing of treatment liquid on an application member, and for example, denotes an operation relating to the rotation (preliminary rotation) of the roller for reducing the viscosity of the treatment liquid, the thickened matter, and sticking matter, on the surface of the application roller 1001. In addition, "preprocessing operation" denotes "an application initial operation" described in sixth and seventh embodiments.

By the way, in Japanese Patent Application Laid-open No. 2002-96452, when no application is performed, the application roller, which directly applies the liquid to the medium, or the roller, which supplies the application liquid to the application roller, remains soaked in a predetermined amount of application liquid stored in a liquid room. At this time, when the application is not performed for a long time, there are concerns that the surface of the roller soaked in the application liquid deteriorates by the application liquid to generate unevenness in the surface characteristic, and that unevenness of the application may occur in a following application operation. Accordingly, in this embodiment, the application liquid is discharged from the liquid retention member 2001 with a predetermined timing when no application is performed, and collected to the storage tank 3003.

Then, in Japanese Patent Application Laid-open No. 2002-96452, at the restarting time after the device is left with the device power-off unused for a long time, the application operation is performed without recording medium (empty application) to make a control to cause the liquid on the surface of the application member to return to a general specified physical property value (of such as viscosity). In this control, since the device should be returned to the normal state without fail, for example, even when a user almost left the device unused during the manufacturer's guarantee period time, a break-in operation (such as the empty rotation) have to be carried out for an extremely long time.

Then, in this embodiment, the preprocessing operation is carried out prior to the current application operation, thereby reducing or removing the thickened matter and sticking matter formed on the surface of the roller. Especially, in this embodiment, as in the description to be given later, the rotation of the application roller 1001 in the preprocessing operation is changed in accordance with a lapse of time between the end time of the previous collection operation of the application liquid and the start time of the current application operation, so that the preprocessing operation can be performed for a suitable time period according to the lapse of time.

Accordingly, it is possible to suppress deterioration in the surface of the application roller 1001 due to the application liquid left on the surface of the application roller 1001 after collection of the application liquid. Moreover, since the thickened matter and sticking matter formed on the surface of the application roller 1001 can be reduced or removed, the application liquid with the general specified physical property value (of such as viscosity) can be applied to the surface of the application roller 1001 at the time of application operation. Still moreover, the preprocessing operation can be performed for a suitable time period according to the lapse of time, so that the device restarting time can be shortened even in the case where the device is left unused for a long time, and thus a cost reduction can be achieved.

In step S4, when the preprocessing is finished, the application roller 1001 on which the thickened matter and sticking matter are reduced or removed starts to rotate clockwise as shown by an arrow in FIG. 2 (step S5). With this rotation of the application roller 1001, the application liquid L filled in the liquid retention space S overcomes the pressing force of the contact member 2009 of the liquid retention member 2001 against the application roller 1001, and passes through the interface between the application roller 1001 and the lower edge portion 2011 of the contact member 2009. The application liquid L passed therethrough adheres to the outer circumferential surface of the application roller 1001 in the form of the film. The application liquid L adhering to the application roller 1001 is sent to a contact portion between the application roller 1001 and the counter roller 1002.

Note that, the above preprocessing operation is performed by the rotation of the application roller 1001, but when the application roller is not once stopped, the operation may skip step S5 and go to step S6.

Subsequently, the application medium feeding mechanism 1006 transfers an application medium to the interface between the application roller 1001 and the counter roller 1002 to insert the application medium therebetween. The application medium is then transferred toward a delivery unit as the application roller 1001 and the counter roller 1002 rotate (step S6). During the transfer, the application liquid applied to the circumferential surface of the application roller is transferred from the application roller 1001 to the application medium P as show in FIG. 9. Needless to say, means for feeding the application medium to the interface between the application roller 1001 and the counter roller 1002 is not limited to the above feeding mechanism. Any means can be used. For example, manual feeding means accessorily utilizing a predetermined guide member may be used together, or the manual feeding means may be used alone.

Figure 9:
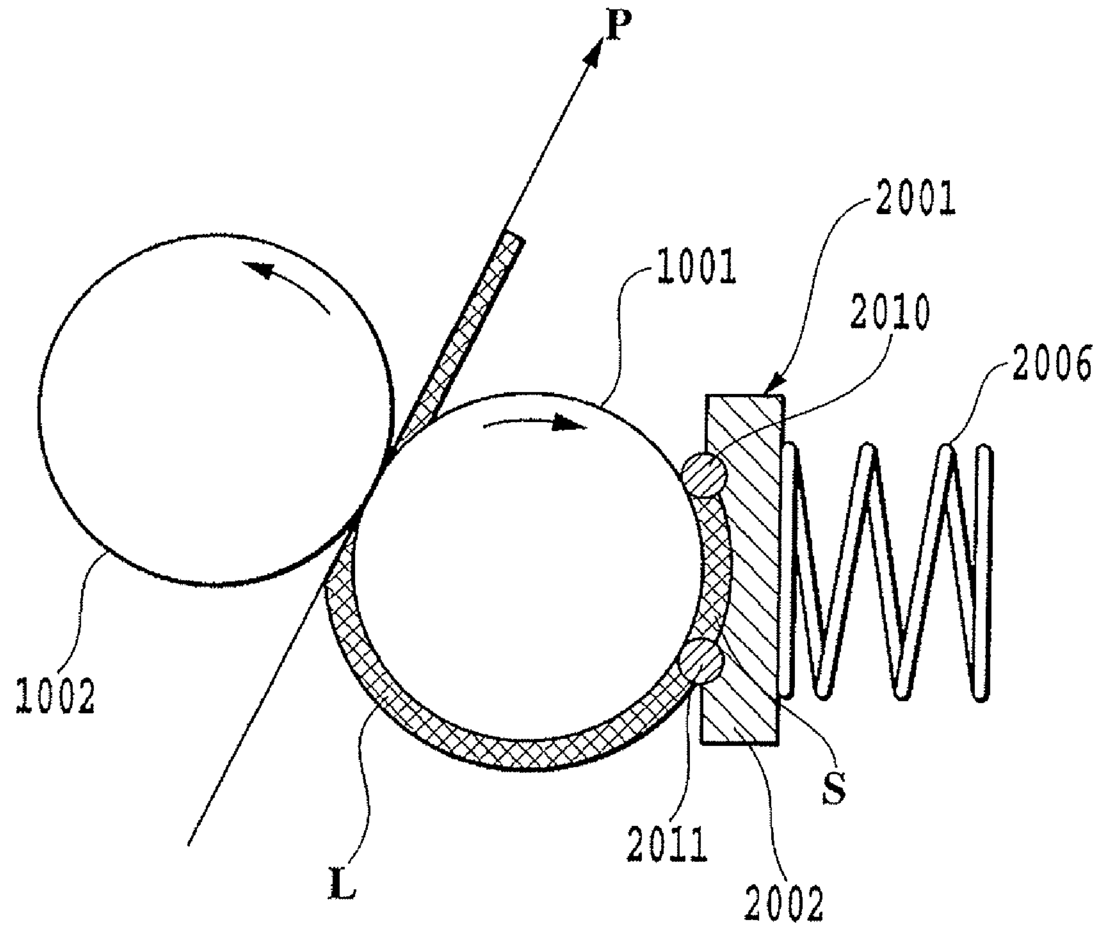
FIG. 9 is a longitudinal sectional view showing a state where a liquid retention space created by the liquid retention member and the application roller is filled with an application liquid, and the liquid is applied to an application medium as the application roller rotates in the embodiment of the present invention.

In FIG. 9, the cross hatched part indicates the application liquid L. It should be note that, in this figure, the thicknesses of the layers of the application liquid on the application roller 1001 and the application medium P is depicted relatively larger than the actual thickness, for the purpose of the clear illustration of the state of the application liquid L shown at the time of the application.

In this way, the part of an application medium P to which the liquid has been applied is transferred in the direction indicated by the arrow by the transferring force of the application roller 1001, and, at the same time, the part of the application medium P to which the liquid is not applied is transferred to the contact area between the application medium P and the application roller 1001. By performing this operation continuously or intermittently, the application liquid is applied to the entire surface of the application medium.

Incidentally, FIG. 9 shows an ideal state of application where all the application liquid L, which has passed the contact member 2009 and has stuck to the application roller 1001, has been transferred to the application medium P. In fact, however, all the application liquid L having stuck to the application roller 1001 is not always transferred to the application medium P. Specifically, in many cases, when the transferred application medium P moves away from the application roller 1001, the application liquid L also sticks to the application roller 1001, and thus remains on the application roller 1001. The remaining amount of the application liquid L on the application roller 1001 varies depending on the material of the application medium P and the microscopic irregularities of the surface. In a case where the application medium is a plain paper, the application liquid L remains on the circumferential surface of the application roller 1001 after the application operation.

Figure 24:
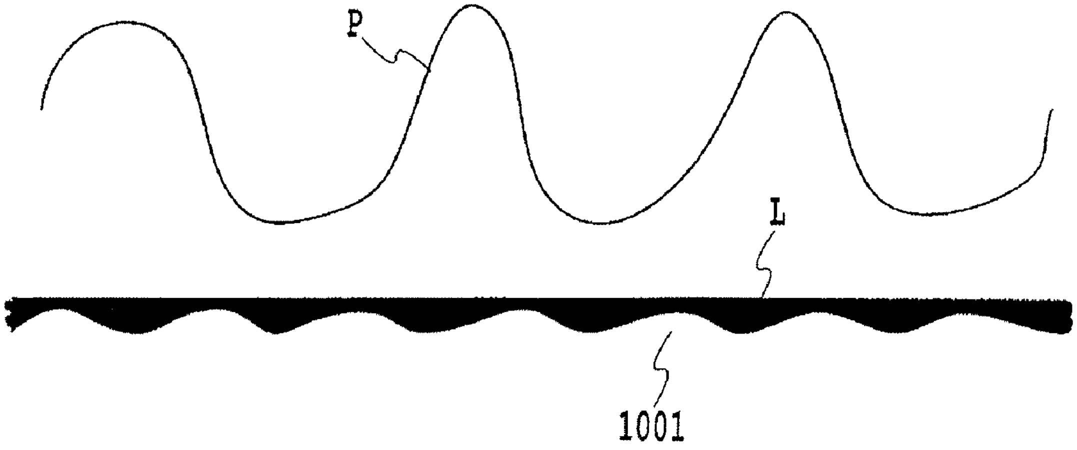
FIG. 24 is an explanatory view explaining an application step between a surface of a medium P and an application surface when the medium P is plain paper.
Figure 25:
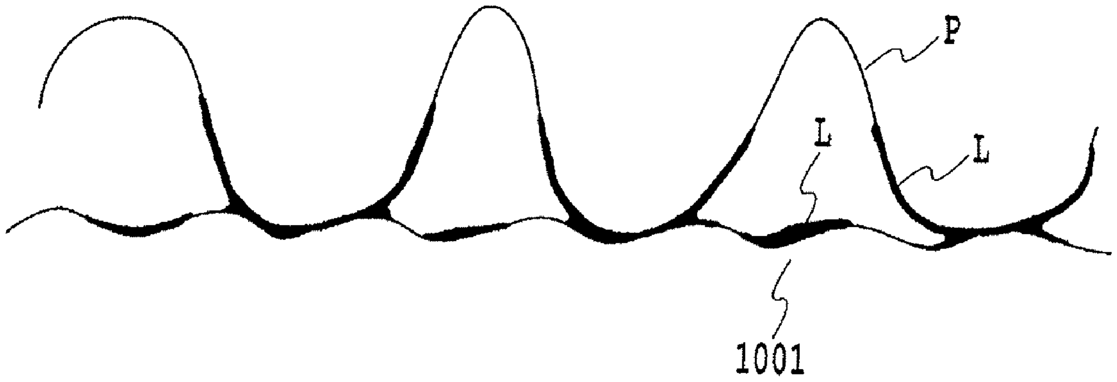
FIG. 25 is an explanatory view explaining an application step between a surface of a medium P and an application surface when the medium P is plain paper.
Figure 26:
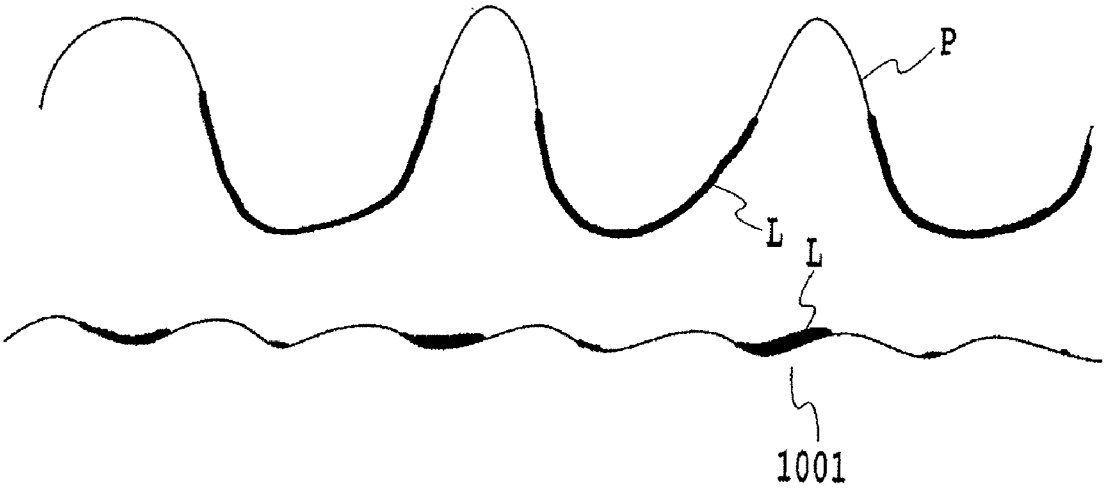
FIG. 26 is an explanatory view explaining an application step between a surface of a medium P and an application surface when the medium P is plain paper.

FIGS. 24 to 26 are explanatory diagrams for explaining an application process proceeding between the application surface and the surface of the medium in a case where the medium P is a plain paper. In these figures, the liquid is expressed by the regions filled in with black.

FIG. 24 shows a state of the application roller 1001 and the counter roller 1002 in an area upstream of the nip area thereof. In this figure, the liquid has stuck to the application surface of the application roller 1001 in such a manner that the liquid thinly covers the microscopic irregularities of the application surface.

FIG. 25 shows a state of both of the surface of the plain paper, which is the medium P, and the application surface of the application roller 1001 in the nip area of the application roller 1001 and the counter roller 1002. In this figure, the convex portions of the surface of the plain paper, which is the medium P, abuts on the application surface of the application roller 1001, and, from the abutting portions, the liquid instantly permeates into or sticks on the surface fibers of the plain paper, which is the medium P. The liquid which has stuck to the part of the application surface of the application roller 1001, which part does not abut on the convex portions of the surface of the plain paper, remains on the application surface of the application roller 1001.

FIG. 26 shows a state of the application roller 1001 and the counter roller 1002 in an area downstream of the nip area thereof. This figure shows a state where the medium and the application surface of the application roller 1001 have been completely separated from each other. The liquid sticking to those parts of the applying surface of the application roller 1001 which do not contact with the convex portions on the surface of the plain paper remains on the applying surface. The liquid on the contacting parts also remains with very small amount on the application surface.

The application liquid remaining on the application roller 1001 overcomes the pressing force of the contact member 2009 of the liquid retention member 2001 against the application roller 1001, passes through the interface between the application roller 1001 and an upper edge portion 2010 of the contact member 2009, and is brought back into the liquid retention space S. The returned application liquid is mixed with the application liquid filled in the liquid retention space S.

Figure 10:
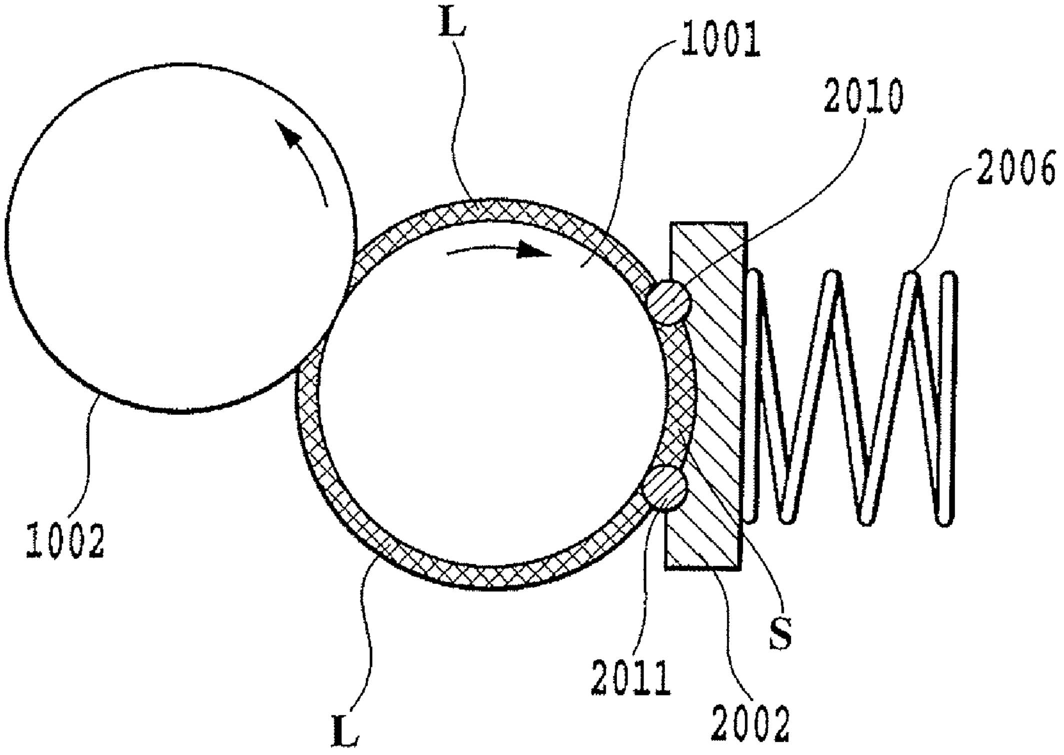
FIG. 10 is a longitudinal sectional view showing a state where the liquid retention space created by the liquid retention member and the application roller is filled with the application liquid, and the application roller is rotated with no application medium present in the embodiment of the present invention.

As shown in FIG. 10, also in a case where the application roller 1001 is rotated when there is no application medium, the returning operation of the application liquid is similarly performed. Specifically, the application liquid stuck to the circumferential surface of the application roller 1001 by rotating the application roller 1001 passes through the interface of the contact area between the application roller 1001 and the counter roller 1002. After this, the application liquid is distributed between the application roller 1001 and the counter roller 1002, and remains on the application roller 1001. The application liquid L sticking to the application roller 1001 passes through the interface between the upper edge portion 2010 of the contact member 2009 and the application roller 1001, enters the liquid retention space S, and is mixed with the application liquid filled in the liquid retention space S.

(Final Step)

Once the application operation to the application medium is completed as described above, the determination is made as to whether the application step may be finished (step S7). When the application step is not finished, the operation goes back to step S6 and the application step is repeated until the completion of the application to all over the parts of the application medium to which the application is required. When the application step is finished, the application roller 1001 is stopped (step S8), and the driving of a pump 3007 is stopped (step S9). After that, the operation moves to step S2 and if the application start command is inputted, the operations in steps S2 to S9 are repeated. On the other hand, when no application start command is inputted, postprocessing such as a collection operation for collecting the application liquid in the liquid retention space S and the liquid channels is performed (step S10) to complete the processing relating to the application.

This collection operation is performed in such a manner that the atmosphere communication valve 3005 and the switching valve 3006 are opened and the pump 3007 is driven to cause the application liquid in the liquid retention space S and the second channel 3002 to flow into the liquid storage tank 3003. This collection operation makes it possible to completely prevent or relax the vaporization of application liquid from the liquid retention space S. After the collection operation, the atmosphere communication valve 3005 is closed and the switching valve 3006 is switched to block the communication between the first channel 3001 and the atmosphere communication port 3013, so that the storage tank 3003 is cut off from the atmosphere. As a result, it is possible to prevent or relax the vaporization of application liquid from the liquid storage tank 3003. In addition to this, even if the device is inclined during being carried or transported, flowing out of the application liquid can be completely prevented or relaxed.

In the application step based on the basic configuration of the aforementioned application device of the embodiment of the present invention, the application liquid remaining on the surface of the application roller 1001 at the previous application operation sometimes vaporizes and thickens in an unoperated time and environment. The vaporization and thickening generate a thickened matter or sticking matter on the surface of the application roller 1001 in some cases. Hereinbelow, description will be given of an example of the preprocessing in the embodiment of the present invention, the preprocessing making it possible to maintain performance of the application operation and not to worse application uniformity on the application medium P, even if the thickened matter or sticking matter exists on the surface of the application roller 1001.

In this embodiment, the number of preliminary rotations R of the application rollers 1001 is determined, as the preprocessing operation, according to the lapse of time between the end of the previous collection operation and the start of the current application operation (here, the start of pump drive). R (number of times) indicates the number of rotations of the application roller 1001.

Additionally, in this specification, the "preliminary rotation" is the rotation for the preprocessing operation of the application roller, that is, the rotation of the application roller, which is performed before the actual application operation.

Figure 14:
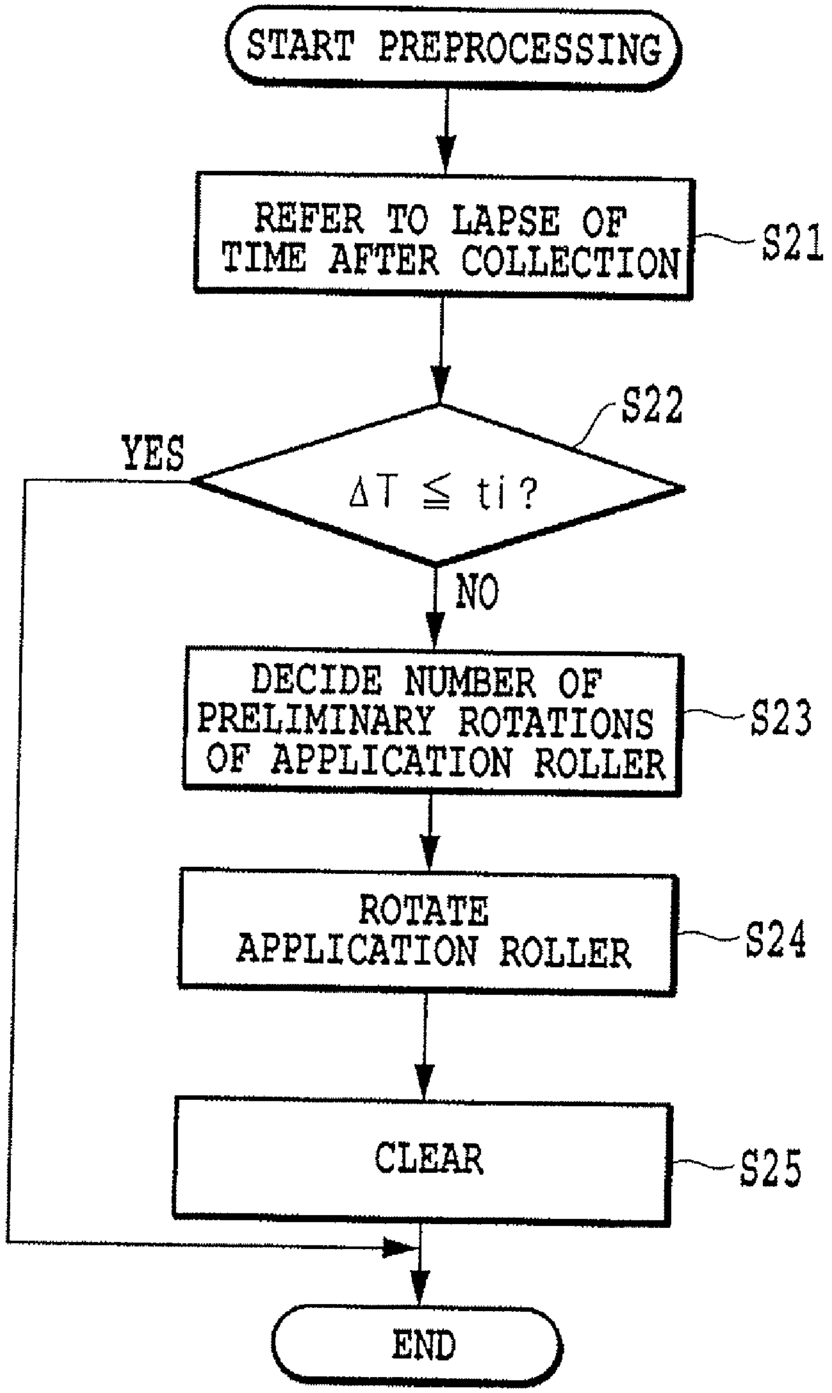
FIG. 14 is a flow chart showing a processing procedure of a preprocessing operation in a first embodiment of the present invention.

FIG. 14 is a flow chart showing a processing procedure of preprocessing in this embodiment.

In step S3 in FIG. 13, when the operation of the pump 3007 is started, previous collection end time information, which indicates an end time of previous collection processing, is read from the nonvolatile memory 4012 in step S21. In addition to this, current time information indicating current time is obtained with reference to a time obtained by an internal timer built in the liquid application device or an external device (not shown) having a function of measuring time. By obtaining a difference between the current time and the end time of the previous collection from the above current time information and previous collection end time information, information on a lapse of time, which indicates a lapse of time between the end time of the previous collection and the start time of the current application, is obtained and stored in a RAM 4003.

In step S22, determination as to whether the preprocessing operation is necessary is made based on the lapse of time information stored in the RAM 4003. More specifically, when time ranges are defined in relation to the number of preliminary rotations in a look-up table (LUT) in FIG. 19, it is determined whether a lapse of time $\Delta T$ reaches the maximum time $t_i$ (60 seconds in FIG. 19) in the time range where no preliminary rotation is required. As a result of the determination, when the lapse of time $\Delta T$ is more than time $t_i$, the operation goes to step S24 and the number of preliminary rotations R of the application roller is decided. On the other hand, when the lapse of time $\Delta T$ is equal to or less than time $t_i$, the preprocessing is directly finished without performing the preliminary rotation of the application roller. In other words, according to LUT shown in FIG. 19, when $\Delta T \leqq t_i$ (=60 seconds), the corresponding number of preliminary rotations R is 0, and thereby the preliminary rotation is not performed.

When the lapse of time $\Delta T$ is more than time $t_i$, the number of preliminary rotations R of the application roller is decided according to the lapse of time information with reference to LUT stored in the ROM 4002 and shown in FIG. 19.

According to LUT shown in FIG. 19, where 60 seconds<$\Delta T \leqq$10 minutes, the number of preliminary rotations is set at 3, and where 10 minutes<$\Delta T \leqq$24 hours, the number of preliminary rotations is set at 10. Moreover, where $\Delta T$>24 hours, the number of preliminary rotations is 100. Since the amounts of thickened matter and sticking matter are increased as the lapse of time is increased, the number of preliminary rotations is set at larger number as the lapse of time is increased.

Since the number of preliminary rotations is decided according to the lapse of time, it is possible to perform preliminary rotations for the optimal time period according to the length of the lapse of time. Accordingly, since the preprocessing is not performed for a long time when the lapse of time is short, it is possible to minimize the time required for the preprocessing. Furthermore, since the optimal preprocessing operation is performed according to the lapse of time, it is possible to appropriately reduce or remove the thickened matter and sticking matter adhering to the surface application roller 1001 regardless of the lapse of time, and to reduce unevenness of the application after each elapsed time. Still furthermore, since the optimal preprocessing operation is performed according to the lapse of time, there is no need to perform excessive preprocessing, making it possible to aim at shortening the start-up time of the liquid application device.

It should be noted that the look-up table shown in FIG. 19 is merely one example and the number of divisions of the time range, the number of preliminary rotations and the length of time range may be set according to the environment of the device and the design thereof. Namely, in this embodiment, it is important to change the number of preliminary rotations according to the lapse of time, and for this purpose the look-up table, which shows the relationship in which the number of preliminary rotations is increased as the lapse of time is increased, is used.

In step S24, the roller drive motor 1004 is driven, thereby rotating the application roller 1001 by the number of preliminary rotations of the application roller 1001 decided in step S23. At this time, rotational speed of the application roller 1001 is fixed regardless of the number of preliminary rotations. In the preprocessing operation, the application roller 1001 is rotated by the appropriate number of rotations to overcoat the application liquid on the surface of the application roller 1001, thereby making it possible to replace the thickened matter and sticking matter adhering to the surface of the application roller 1001 with fresh application liquid.

In other words, by the aforementioned preliminary rotation, when the surface of the application roller 1001, to which the thickened matter and sticking matter adhere, is soaked in the application liquid retained in the liquid retention space S the above-adhering thickened matter and sticking matter are compatible with the application liquid retained in liquid retention space S. As a result, the above-adhering thickened matter and sticking matter are reduced or removed, the viscosity of the application liquid in the surface of the application roller is reduced. In addition to the aforementioned compatibility, the above-adhering thickened matter and sticking matter sometimes peel off the application roller 1001. In this embodiment, since the application liquid is circulated in the application liquid channels during the preprocessing operation, the peel-off thickened matter and sticking matter are carried from the liquid retention space S to the storage tank 3003. The thickened matter and sticking matter carried to the storage tank 3003 are compatible with the application liquid stored in the storage tank 3003 and returned to the application liquid with appropriate concentration.

Furthermore, the thickened matter and sticking matter adhering to the surface of the application roller are sometimes scraped by the aforementioned preliminary rotation when passing through a contact portion between the application roller 1001 and the upper edge portion 2010 of the contact member 2009. In other words, the surface of the application roller 1001 and the upper edge portion 2010 are slid and rubbed against each other by the rotation of the application roller 1001. Accordingly, when the thickened matter and sticking matter adhering to the application roller 1001 reach the contact portion between the application roller 1001 and the upper edge portion 2010 where the sliding and friction occur, the thickened matter and sticking matter peel off from the contact portion. This phenomenon also occurs on a contact portion between the application roller 1001 and a lower edge portion 2011 of the contact member 2009.

When the above preliminary rotation is finished, the rotation of the application roller 1001 is stopped to clear the lapse of time information stored in the RAM 4003 to zero in step S25. The information of the lapse of time is thus cleared, so that it is determined that the lapse of time $\Delta T$ is zero in step S22 for a next application operation after start-up. This makes it possible to finish the preprocessing operation without performing the preliminary rotation and to proceed to the next application operation.

An explanation will be next given of a postprocessing operation (step S10 in FIG. 13) in this embodiment.

Figure 15:
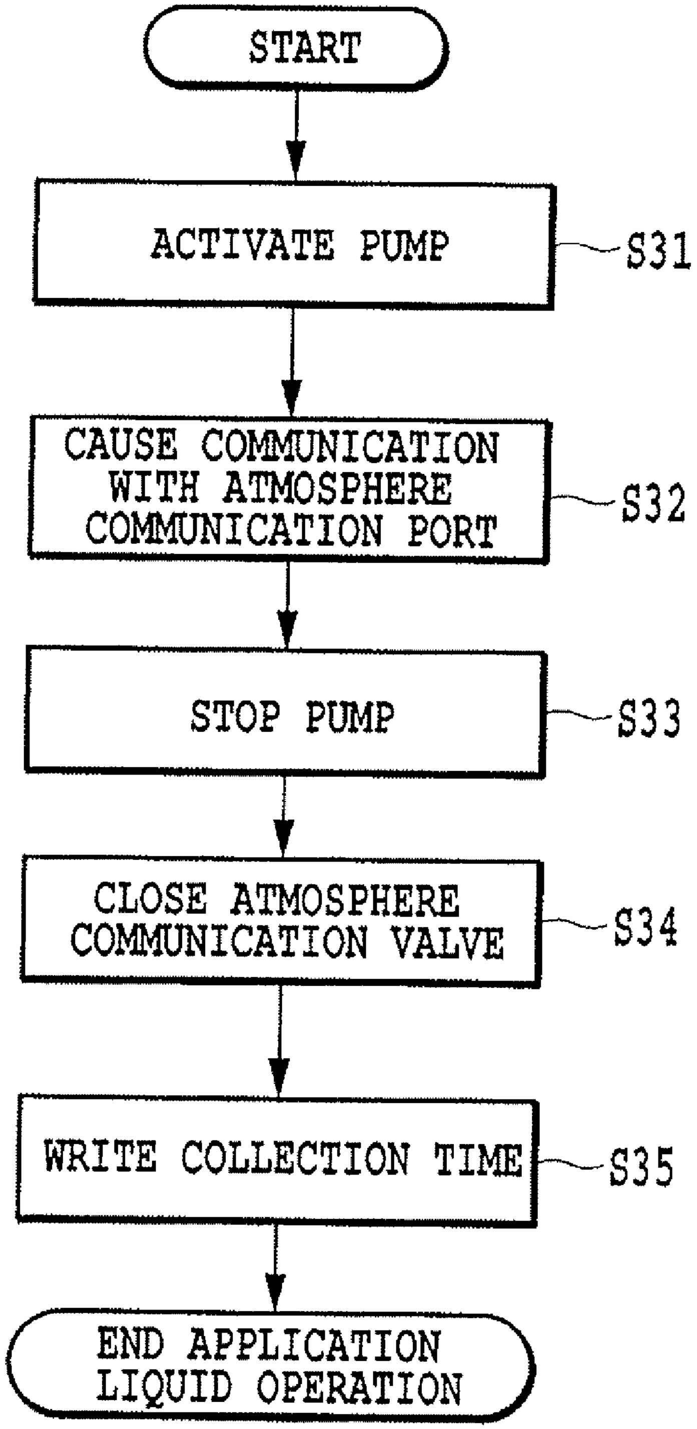
FIG. 15 is a flow chart showing a processing procedure of a postprocessing operation in the first embodiment of the present invention.

FIG. 15 is a flow chart showing a processing procedure of postprocessing operation in this embodiment.

When no application start command is inputted in step S2 in FIG. 13, the collection operation of the application liquid retained in the liquid retention member 2001 is started.

When the application liquid collection operation is started, the pump 3007 is driven to cause the application liquid to flow from the pump 3007 to the stage tank 3003. In addition, when the pump 3007 is not stopped in step S9, this step is omitted. In this case, once the application liquid collection operation is started, the operation goes to step S32.

In step S32, the switching valve (three-way valve) 3006 is switched to allow the atmosphere communication port 3013 and the tube 3012 to communicate with each other. Namely, a supply route from the storage tank 3003 to the liquid retention member 2001 is blocked, thereby stopping the supply of the application liquid to the liquid retention member 2001. At this time, since the pump 3007 causes a liquid flow in a direction indicated by an arrow shown in FIG. 11, the application liquid existing in each of the channels, which run from the liquid-retention-member side tube 3012 to the second channel 3002, including the liquid retention member 2001, is collected to the storage tank 3003. In addition, these channels are filled with air from the atmosphere communication port 3013.

In step S33, the driving of the pump 3007 is stopped.

As a result, the storage tank 3003 is cut off from the second channel 3002. The tube 3011 is also cut off from the tube 3012 by the switching valve 3006. It should be noted that the driving of the pump 3007 may be stopped after a predetermined time passes since the switching valve 3006 is switched in step S32. Furthermore, for example, a sensor as means for detecting whether the application liquid remains in the liquid retention member 2001 may be provided in the liquid retention member 2001, in order to stop the pump 3007 based on the detection information.

In step S34, the atmosphere communication port 3004 is closed. In this state, the storage tank 3003 is cut off from the atmosphere.

In step S35, current collection end time information, which indicates an end time of the current collection, is obtained with reference to a time obtained by an internal timer built in the liquid application device or an external device (not shown) having a function of measuring time, and the current collection end time information is stored in the nonvolatile memory 4012. The collection end time information stored in the nonvolatile memory 4012 is used in a next preprocessing operation.

As mentioned above, in the preprocessing operation of this embodiment, by rotating the application roller 1001 by the number of preliminary rotations according to the lapse of time, and the thickened matter and sticking matter adhering to the application roller 1001 are reduced or removed. In this preprocessing operation, the application liquid can be refreshed by the appropriate preliminary rotation even if the application liquid remaining on the surface of the application roller 1001 vaporizes and thickens in an unoperated time and environment. This makes it possible to avoid the influence of the thickened application liquid and sticking matter, which considerably worsen the application performance just after restarting the application device, and to always provide a uniform application function.

It should be noted that the important point in this embodiment is to decide the preprocessing operation time appropriate to the lapse of time. Accordingly, in this embodiment, the number of preliminary rotations of the application roller 1001 is changed in the case where rotational speed of the application roller 1001 is fixed, so that a time required for the preprocessing operation is controlled. In this embodiment, a control of the number of preliminary rotations according to the lapse of time is one of elements for controlling the time required for the preprocessing operation.

Accordingly, although, a time required for the preprocessing operation information is controlled by controlling the number of preliminary rotations of the application roller according to the lapse of time in this embodiment, the preprocessing operation time control is not limited to this. For example, by adjusting the preliminary rotational speed and the interval between the preliminary rotations of the application roller in the case where the number of rotations of the application roller is fixed, an effect similar to that of this embodiment can be obtained. The above preliminary rotational interval indicates an intermittent rotation where the application roller is rotated by a predetermined angle and a next rotation is performed after a predetermined time passes, that is, an interval time. Moreover, in this embodiment, the preliminary rotational speed of the application roller or the preliminary rotational interval may be adjusted in the case where a rotational time of the application roller 1001 is fixed in the preprocessing operation.

Still moreover, in this embodiment, the method of deciding the lapse of time is not limited to the aforementioned manner by use of the current time acquisition, and there may be used a method in which a timer is provided in the liquid application device, whereby acquiring the lapse of time from the end time of the previous collection.

SECOND EMBODIMENT

FIG. 20 is a look-up table for deciding the number of preliminary rotations (preliminary rotational time) in this embodiment. The preprocessing operation in this embodiment aims at discharging the thickened matter of the application liquid remaining on the application roller and in the liquid retention member and dust adhering thereto when the device is left unused for a long time when ΔT is 24 hours or more. Namely, this is the control method for collecting the application liquid at least once after the fixed number of preliminary rotations are performed.

Figure 16:
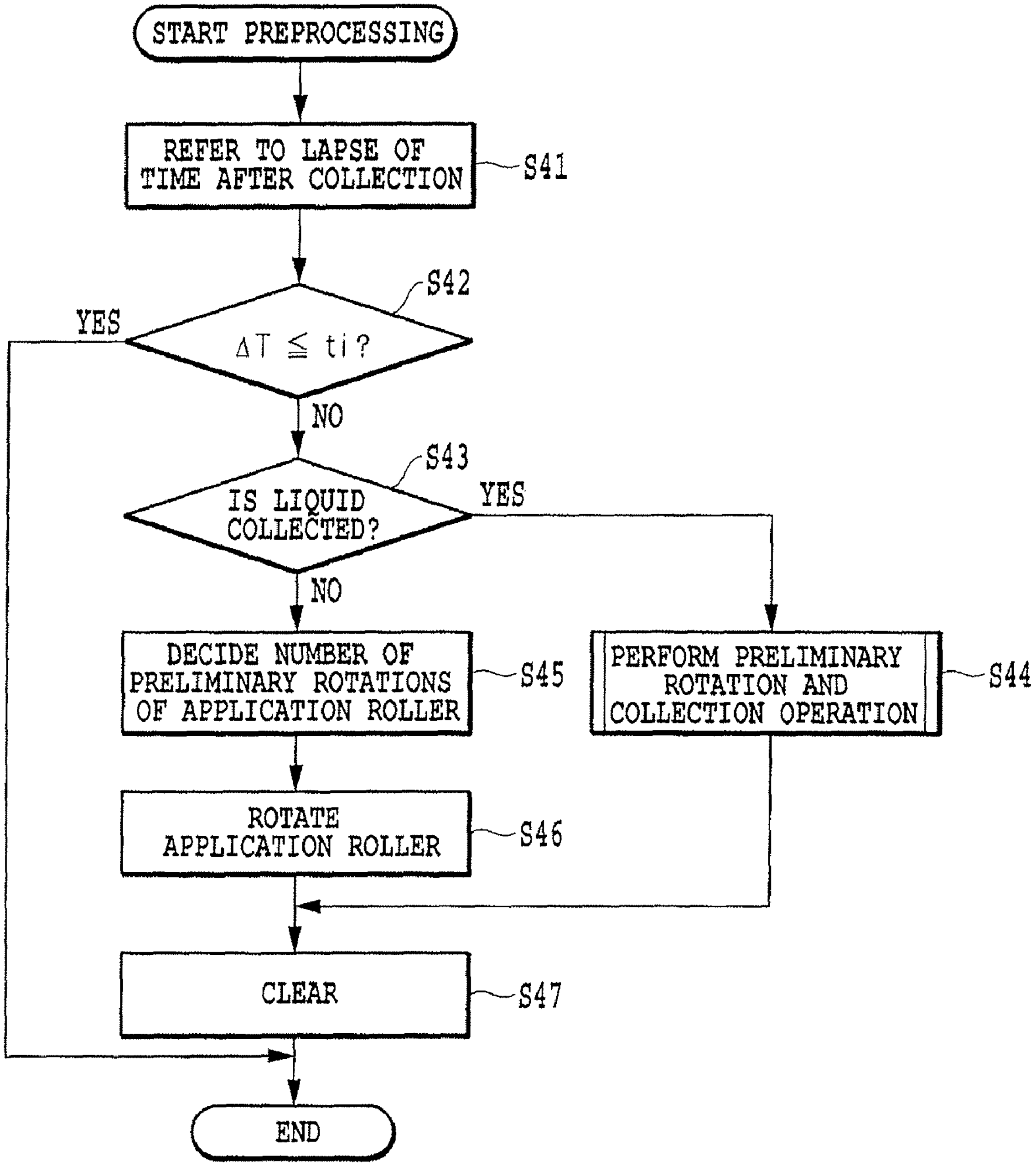
FIG. 16 is a flow chart showing a processing procedure of a preprocessing operation in a second embodiment of the present invention.

FIG. 16 is a flow chart showing a processing procedure of preprocessing in this embodiment.

In FIG. 16, processing in steps S41, S42 and S45 to S47 are the same as processing of steps S21, S22 and S23 to S25 shown in FIG. 14, respectively.

In this embodiment, information on a lapse of time, which indicates a lapse of time between the end time of the previous collection and the start time of the current application (here, start of the pump drive), is obtained, and then is stored in the RAM 4003 (step S41). Sequentially, determination is made as to whether the preprocessing operation such as the preliminary rotation, collection operation and the like is needed based on the information of the lapse of time stored in the RAM 4003. The determination in step S42 is made using the look-up table (LUT) shown in FIG. 20. When it is determined that the preliminary rotation and the collection operation are not needed, the preprocessing is finished without performing the preliminary rotation and the collection operation.

When it is determined that the preliminary rotation and the collection operation are needed, determination is made as to whether the lapse of time ΔT is more than 24 hours by use of the information of the lapse of time with reference to LUT which is stored in the ROM 4002 and shown in FIG. 20 (step S43). When the lapse of time ΔT is more than 24 hours, the operation goes to step S44 and when the lapse of time ΔT is equal to or less than 24 hours, the operation goes to step S45.

Figure 17:
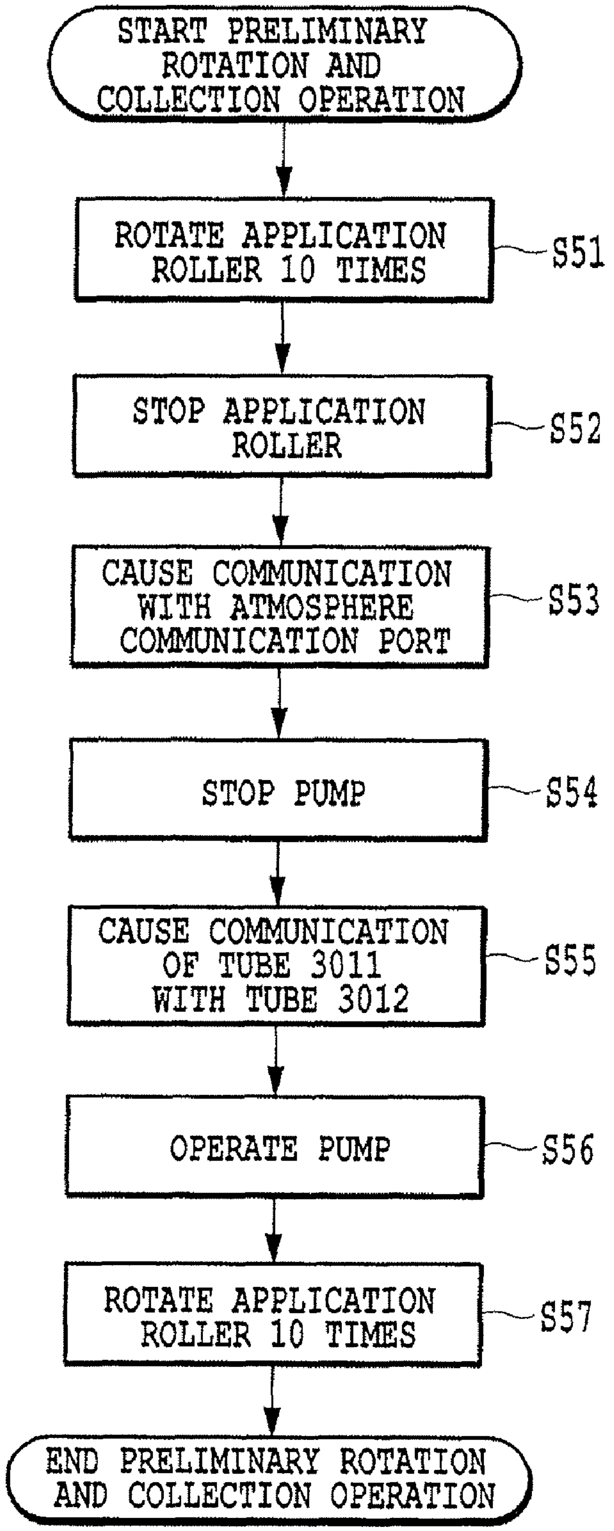
FIG. 17 is a flow chart showing a processing procedure of preliminary rotation and collection operations in the second embodiment of the present invention.

In step S44, the preliminary rotation and collection operation are performed according to a flow chart shown in FIG. 17.

In FIG. 17, when the preliminary rotation and collection operation are started, the application roller 1001 is rotated ten times (step S51) and then stopped (step S52). Since the application liquid is once collected to the storage tank 3003 from the liquid retention member 2001, the switching valve (three-way valve) 3006 is switched to allow the atmosphere communication port 3013 and the tube 3012 to communicate with each other. At this time, since the pump 3007 causes a liquid flow in a direction indicated by the arrow shown in FIG. 11, the application liquid existing in each of the channels, which run from the liquid-retention-member side tube 3012 to the second channel 3002, including the liquid retention member 2001, is collected to the storage tank 3003. These liquid channels are filled with air from the atmosphere communication port 3013.

When collection of the application liquid in the liquid retention member 2001 to the storage tank 3003 is completed after a predetermined time period, the pump 3007 is stopped (step S54) and the switching valve 3006 is switched to allow the tube 3011 and the tube 3012 to communicate with each other (step S55). Sequentially, the pump 3007 is driven (step S56) to fill the application liquid into the liquid retention space S and the channels 3001 and 3002 again. After that, in step S57, the application roller 1001 is rotated ten times to finish the preliminary rotation and collection operation, and then the operation goes to step S47.

The number of preliminary rotations R is decided according to the lapse of time with reference to LUT in step S45, and the application roller 1001 is rotated by the decided number of preliminary rotations R (step S46).

When the preliminary rotation is finished, the rotation of the application roller 1001 is stopped and the information of the lapse of time stored in the RAM 4003 is cleared to zero.

When the lapse of time between the end time of the previous collection and the start time of the current application operation is long, the thickened matter and sticking matter, or dust, peeling off from the surface of the application roller 1001 by the preliminary rotation, are sometimes accumulated in the liquid retention member 2001. However, in this embodiment, when the lapse of time is long, the application liquid retained in the liquid retention member 2001 is once collected after the preliminary rotation is performed. Accordingly, this collection operation causes the thickened matter and sticking matter, or dust, to be collected to the storage tank 3003. The application liquid in a good condition can be supplied to the liquid retention member 2001 if the application liquid is filled again after this collection. Thus, the application liquid to be supplied to the surface of the application roller 1001 can be also in a good condition.

Note that, although the number of preliminary rotations is ten in steps S51 and S57 in FIG. 17, the number of preliminary rotations is not limited to this value. Moreover, it is needless to say that the application roller rotational times in steps S51 and S57 are controllable by not only the number of rotations but also the preliminary rotational speed and the preliminary rotational interval. Still moreover, in this embodiment, although the pump is often activated and stopped, the pump can be consistently activated.

Furthermore, in this embodiment, what is important is not the number of collections in the preprocessing operation but the collection of the application liquid to the storage tank prior to the current application operation after the end of the predetermined number of preliminary rotations. Accordingly, in this embodiment, although the collection of the application liquid in the preprocessing operation is performed once, the collection thereof may be performed two or more times.

THIRD EMBODIMENT

In the first and second embodiments, the preprocessing operation is performed before the start of the current application, after the previous collection is ended and the predetermined time has passed. On the other hands, in this embodiment, the preprocessing operation is controlled according to the lapse of time between the end time of the previous application operation (stop time of the rotation of the application roller for the application operation) before previous collection operation and the start time of the current application operation (start time of the rotation of the application roller for the application operation).

Figure 18:
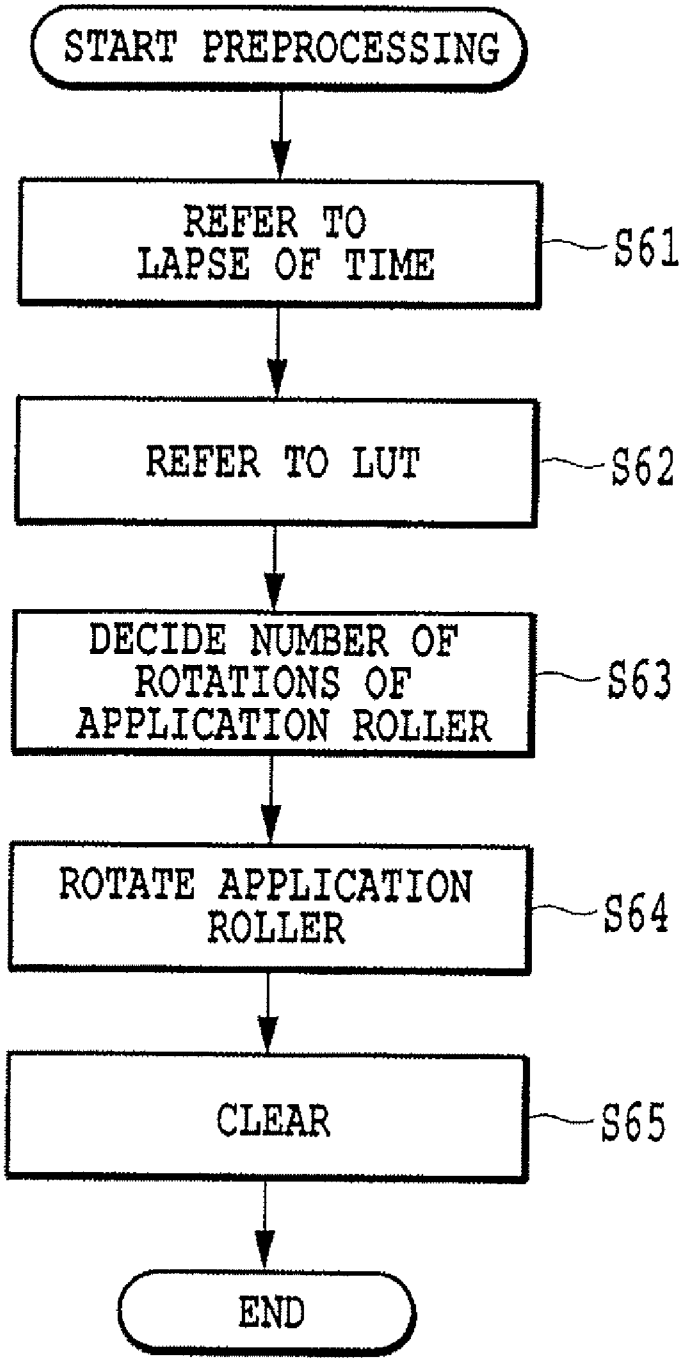
FIG. 18 is a flow chart showing a processing procedure of a preprocessing operation in a third embodiment of the present invention.

FIG. 18 is a flow chart showing a processing procedure of preprocessing in this embodiment.

In step S3 in FIG. 13, when the operation of the pump 3007 is started, the previous stop time information, which indicates the time when the application roller 1001 is stopped, is read from the nonvolatile memory 4012 in step S61. In addition to this, current time information indicating the current time is obtained by referring to an internal timer built in the liquid application device or an external device (not shown) having a function of measuring time. A difference between the current time and the previous stop time is obtained based on the current time information and the previous stop time information, and thereby information on a lapse of time, which indicates the lapse of time between the previous time when the application roller is stopped and the start time of the current application, is obtained to be stored in a RAM 4003.

Sequentially, LUT shown in FIG. 19 is referred (step S62), and then the number of preliminary rotations R of the application roller is decided (step S63).

Since the number of preliminary rotations is thus decided according to the lapse of time from the previous application operation as described above, the appropriate preprocessing operation can be performed even if the collection operation dose not performed as the postprocessing operation. The preprocessing operation is performed for a time according to the lapse of time between the end time of the previous application and the start time of the current application. Accordingly, it is possible to reduce unevenness of the application of the application liquid to the application medium for each lapse of time and to further improve the application.

In step S64, the roller drive motor 1004 is driven to rotate the application roller 1001 by the number of preliminary rotations of the application roller 1001 decided in step S63. At this time, the rotational speed of the application roller 1001 is constant regardless of the number of preliminary rotations. In the preprocessing operation, the application roller 1001 is rotated by the appropriate number of rotations to overcoat the application liquid on the surface of the application roller 1001, thereby making it possible to replace the thickened matter and sticking matter adhering to the surface of the application roller 1001 with the fresh application liquid. Here, when the number of preliminary rotations decided in step S63 is zero, the rotation of the application roller is not performed in step S64.

When the above preliminary rotation is finished, the rotation of the application roller 1001 is stopped and the information on the lapse of time stored in the RAM 4003 is cleared to zero in step S65.

Note that, in this embodiment, the current stop time information, which indicates the current time when the application roller 1001 is stopped, is stored in the nonvolatile memory 4012 after the application roller 1001 is stopped in step S8 instead of step S35 shown in FIG. 15. Alternatively, storing the current stop time information may be performed after the pump 3007 is stopped in step S9. For this storing, the current stop time information, which indicates the current stop time, is obtained with reference to a time obtained by an internal timer built in the liquid application device and an external device (not shown) having a function of measuring time. Thereafter, the current stop time information is stored in the nonvolatile memory 4012. The stop time information stored in the nonvolatile memory 4012 is used in the next preprocessing operation.

FOURTH EMBODIMENT

The liquid application devices shown in the first to third embodiments are effective when applied to inkjet recording apparatuses. Description will be given below of the case where the liquid application device described above is applied to an inkjet recording apparatus. However, since the application operation control described in connection with the first to third embodiments is applied similarly, the description thereof will be omitted.

Figure 21:
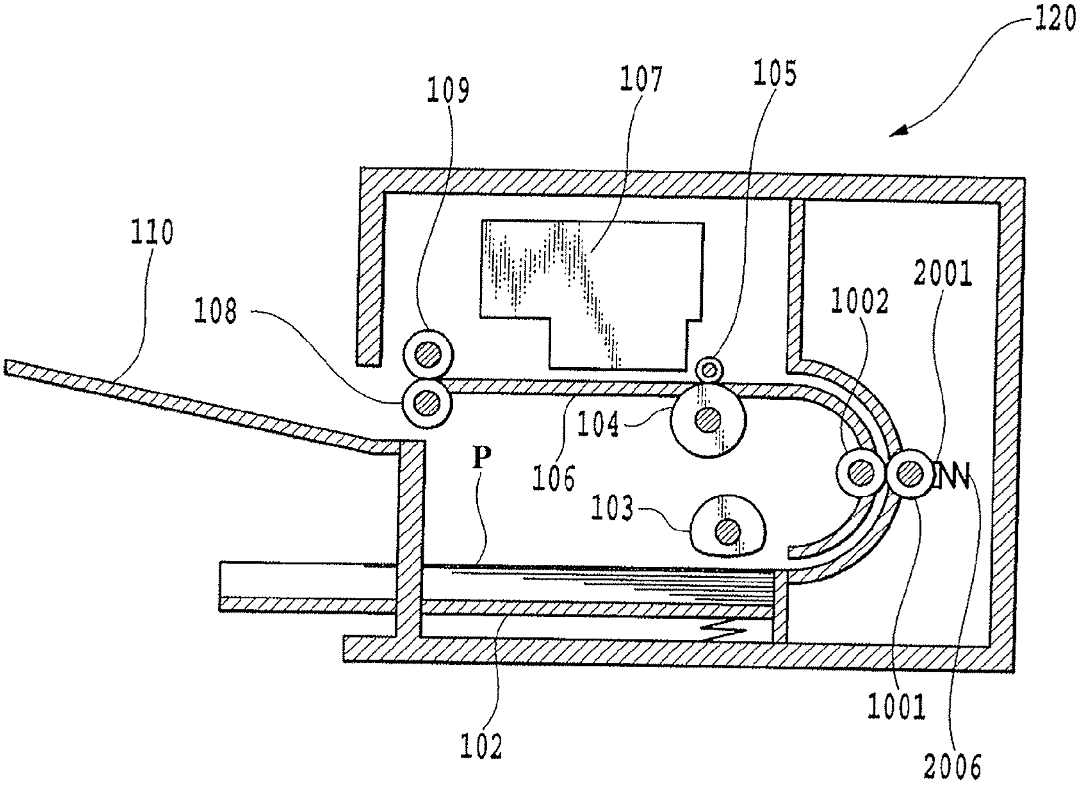
FIG. 21 is a longitudinal sectional view showing a schematic configuration of an ink jet recording apparatus in a fourth embodiment of the present invention.

FIG. 21 is a diagram showing a schematic configuration of the inkjet recording apparatus 120 including the application mechanism having almost the same configuration as that of the above liquid application device.

In the inkjet recording apparatus 120, provided is a feed tray 102 on which a plurality of recording media P are stacked, and a semi lunar shaped separation roller 103 separates the recording media P stacked on the feed tray one by one, and feeds each medium to a transfer path. In the transfer path, the application roller 1001 and the counter roller 1002 constituting the liquid application means of the liquid application mechanism are disposed. The recording medium P fed from the feed tray 102 is transferred to the interface between the rollers 1001 and 1002. The application roller 1001 is caused to rotate clockwise in FIG. 21 by the rotation of the roller drive motor, and applies the application liquid on the recording surface of the recording medium P while transferring the recording medium P. The recording medium P to which the application liquid has been applied is sent to the interface between a transfer roller 104 and a pinch roller 105. Subsequently, the counterclockwise (in this figure) rotation of the transfer roller 104 transfers the recording medium P on a platen 106, and moves the medium to a position facing a recording head 107 being an element of recording means. The recording head 107 is an inkjet recording head in which the predetermined number of nozzles for ejecting ink are arranged. While the recording head 107 scans the recording surface in a direction perpendicular to the plane of the drawing sheet, ink droplets are ejected from the nozzles to the recording surface of the recording medium P in accordance with the recorded data to perform recording. An image is formed on the recording medium while the recording operation and the transfer operation by a predetermined feed carried out by the transfer roller 104 are alternately repeated. With the image forming operation, the recording medium P is held between a sheet discharging roller 108 and a sheet discharging spur roller 109 provided downstream of the scanning region of the recording head in the transfer path of the recording media, and is discharged onto a sheet discharged tray 110 by the rotation of the sheet discharging roller 108.

As the inkjet recording apparatus, a so-called full-line type inkjet recording apparatus can be constructed, which performs the recording operation by using a long recording head which has ink-discharging nozzles arranged across the maximum width of the recording media.

Figure 22:
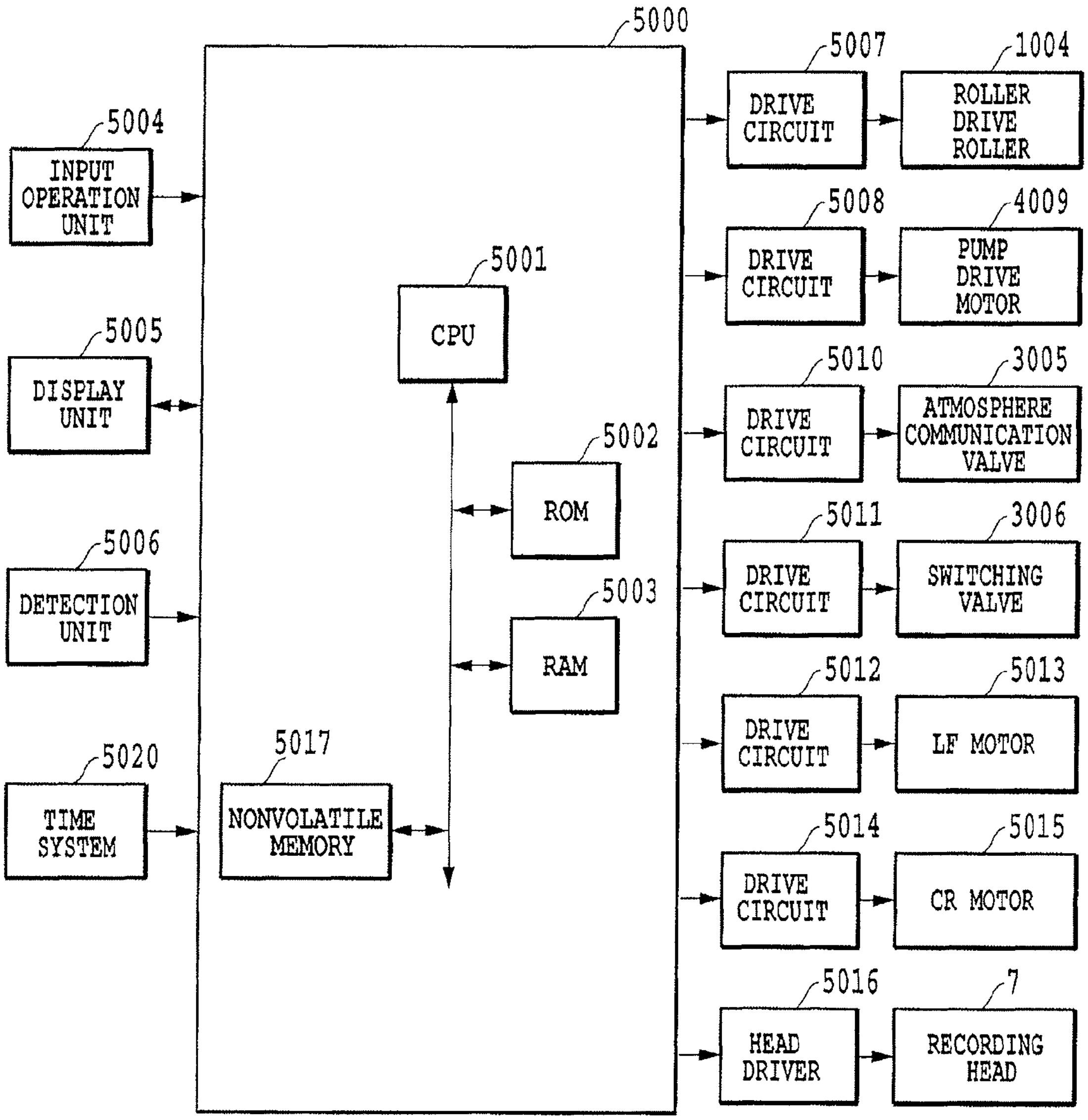
FIG. 22 is a block diagram showing a schematic configuration of a control system in the fourth embodiment of the present invention.

FIG. 22 is a block diagram showing a control system of the above-described inkjet recording apparatus. In this figure, the roller drive motor 1004, the pump drive motor 4009, and the atmosphere communication valve 3005, which are elements of the liquid application mechanism, are the same elements as those described in connection with the above liquid application device.

A CPU 5001 controls the driving of each element of the application mechanism in accordance with the program of a procedure described later in connection with FIG. 23. The CPU 5001 also controls the driving of an LF motor 5013, a CR motor 5015 and the recording head 107, which are included in the recording means, via drive circuits 5012, 5014 and 5016, respectively. Specifically, the transfer roller 104, for example, is rotated by the driving of the LF motor 5013, and a carriage on which the recording head 107 is mounted is moved by the driving of the CR motor. The CPU 5001 also effects control of the ink discharge from the nozzles of the recording head.

Figure 23:
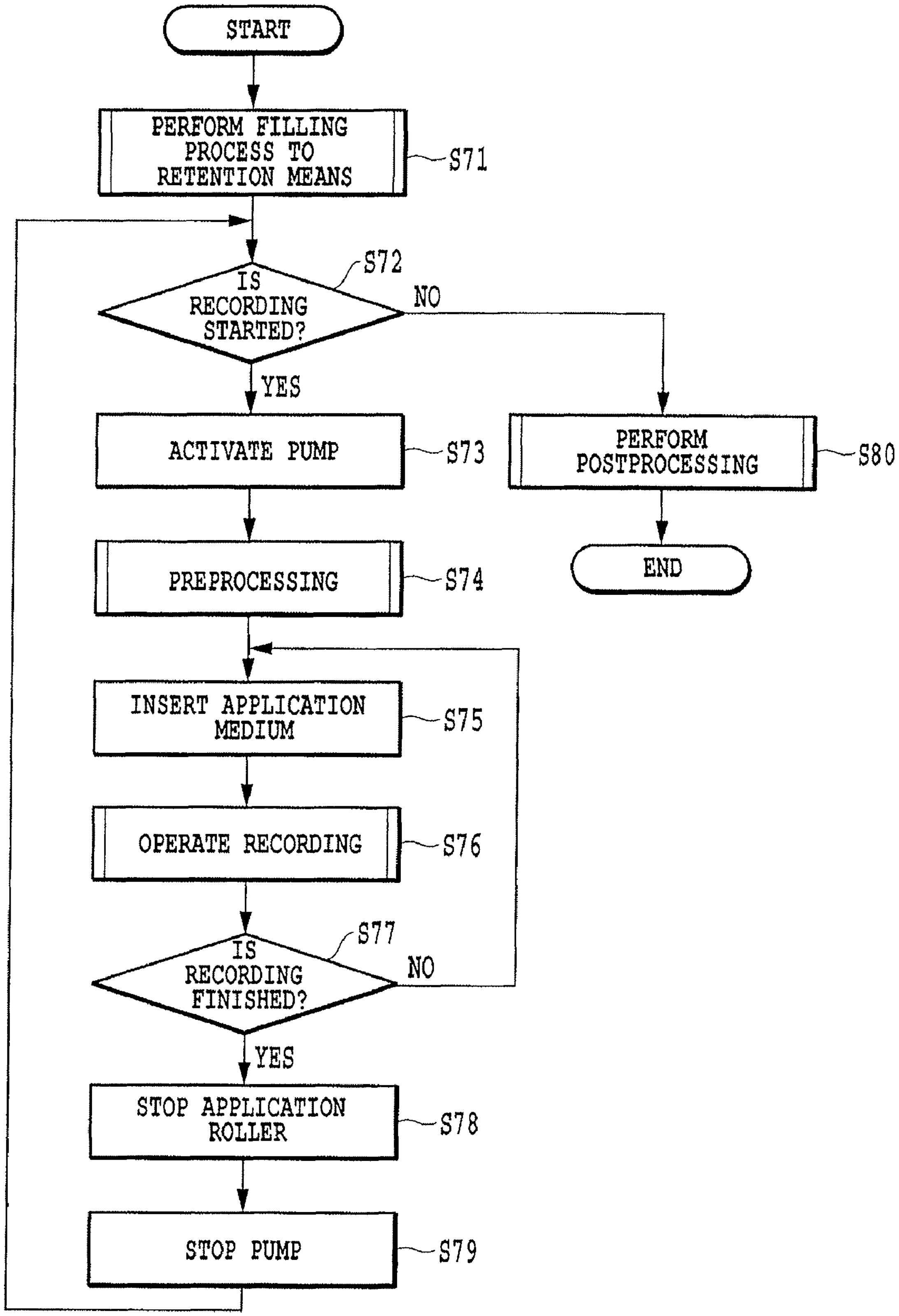
FIG. 23 is a flow chart showing a sequence of an application operation and a recording operation in the fourth embodiment of the present invention.

FIG. 23 is a flow chart showing a procedure of the liquid application operation and the accompanying recording operation using the inkjet recording apparatus of this embodiment.

In this figure, the processes in steps S71 to S75, and steps S78 to S80 are the same as those in steps S1 to S6, and steps S8 to S10, respectively, shown in FIG. 13. That is, the preprocessing of this embodiment (step S74) is the same as the preprocessing described in the first embodiment (step S4).

In this embodiment, when a command to start the recording is received (step S72), the pump is activated (step S73), preprocessing is carried out (step S74). Then, an application medium is passed through nip area between the application roller 1001 and the counter roller 1002 (step S75) and a series of steps for the liquid application operation is performed for the application medium. After these application steps, the recording operation is preformed on the recording medium, the application liquid having been applied to the required part of the recording medium (step S76). Specifically, the recording head 107 is caused to scan a recording medium P which is fed by a predetermined amount each time by the transfer roller 104, and ink is ejected from nozzles in accordance with the recorded data during this scanning, so that the ink is caused to stick to the recording medium to form dots. Since this sticking ink reacts with the application liquid, it is made possible to improve density and to prevent bleeding. Recording on the recording medium P is performed by repeating the transfer of the recording medium and the scanning of the recording head, so that the recording medium on which the recording has been completed is delivered onto the delivery tray 110.

When it is determined that the recording is completed in step S77, processing after step S78 are performed, and then this processing is completed.

FIFTH EMBODIMENT

In the first to fourth embodiments, although the pump 3007 is driven to circulate the application liquid during the preprocessing operation, the pump 3007 may not be driven so that no circulation is performed during the preprocessing operation. That is, the important point of an embodiment of the present invention is to reduce or remove the thickened matter and sticking matter adhering to the surface of the application roller by the preprocessing operation. It is more preferable that the above circulation be performed in rotating the application roller since the fresh application liquid is always supplied to the liquid retention space. However, in the embodiment of the present invention, it is possible to appropriately reduce or remove the thickened matter and sticking matter adhering to the surface of the application roller without performing the above circulation in rotating the application roller.

In the case where no circulation is performed during the preprocessing operation, the preprocessing operation may be performed during the time between steps S2 and S3, in FIG. 13.

SIXTH EMBODIMENT

Figure 27:
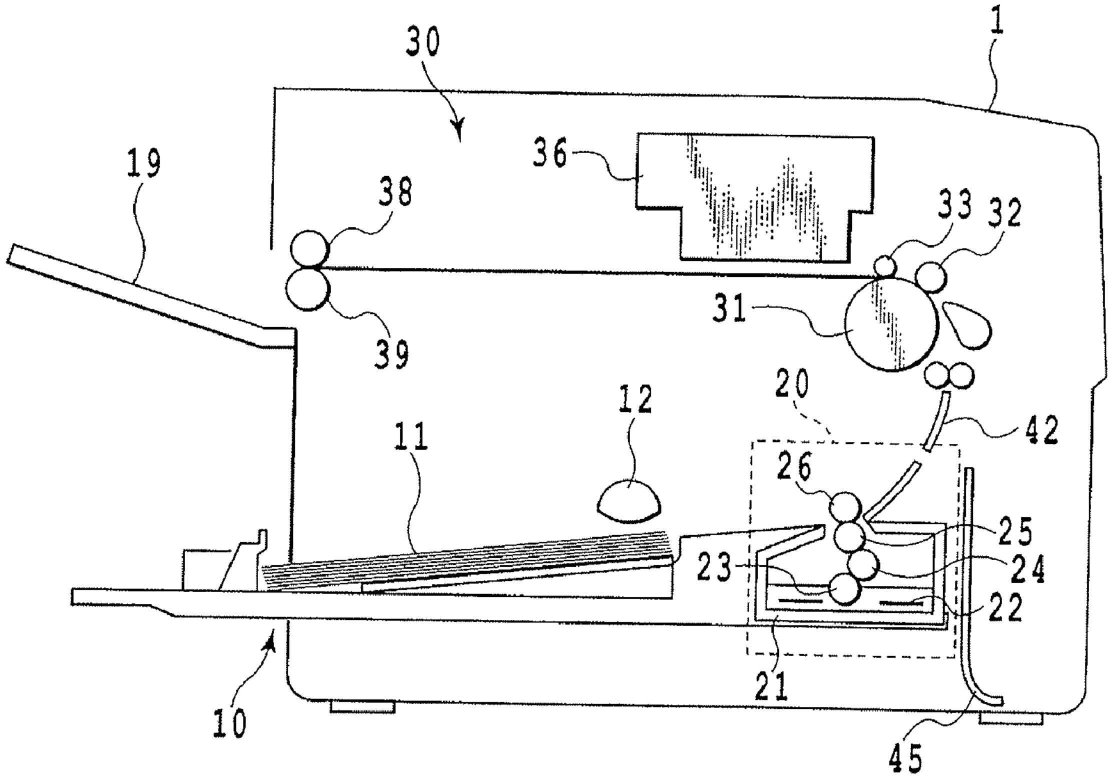
FIG. 27 is a cross sectional view showing a configuration of an ink jet recording apparatus in a sixth embodiment of the present invention.

FIG. 27 is a cross sectional view showing a configuration of an ink jet recording apparatus in a sixth embodiment of the present invention.

As illustrated in FIG. 27, a printer 1, serving as the ink jet recording apparatus of this embodiment, generally includes a paper supply unit 10, an application liquid application unit 20 and a recording unit 30. The paper supply unit 10 has a paper feeding roller 12 which feeds paper 11 as a recording medium.

The application liquid application unit 20 includes an application liquid tank 21 storing application liquid 22 containing a compound which coagulates a coloring material of dye or pigment contained in ink. This unit 20 further includes a pump roller 23 which mixes and pumps the application liquid 22, and a film thickness control roller 24 which make a control to cause the pumped application liquid to form a film with a uniform thickness on an application roller 25, and a counter roller 26 which presses the transferred paper 11 onto the application roller 25.

The recording unit 30 includes a recording unit 36 which performs recording onto the transferred paper 11. The recording unit 36 generally includes a recording head which ejects ink, an ink tank which stores ink to be supplied to the recording head, and a carriage which is structured to mount these recording head and ink tank thereon and to be movable in a direction perpendicular to a paper surface of FIG. 27. The recording unit 30 further includes transfer rollers 31 to 33 which transfer paper 11 to a recording area of the recording unit 36, and discharge rollers 38 and 39 which discharge paper 11 on which the recording has been performed by the recording unit 36.

Figure 28:
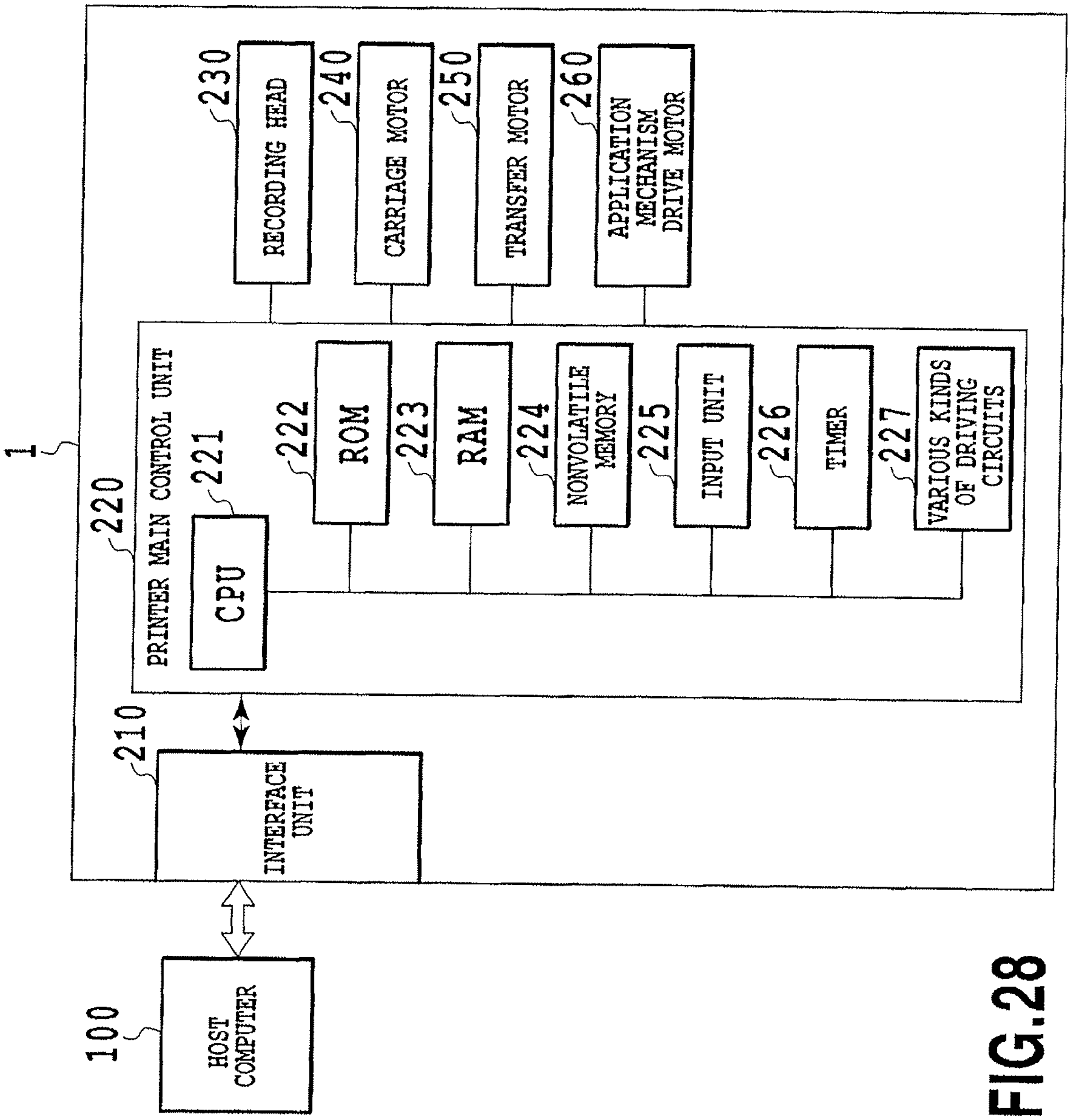
FIG. 28 is a block diagram showing a schematic configuration of a control system of the recording apparatus shown in FIG. 27.

FIG. 28 is a block diagram showing a schematic configuration of a control system of the recording apparatus shown in FIG. 27. In FIG. 28, reference numeral 100 indicates a host apparatus as external input device and can be provided in the form of a computer, a digital camera and the like which transmit recorded data to the printer 1. In the printer 1, reference numeral 210 indicates an interface unit which is connected to the host computer 100 to input recorded data, and reference numeral 220 denotes a main control unit of the printer 1. In the main control unit 220, reference numeral 221 indicates a CPU in the form of a microcomputer. A ROM 222 is a memory which stores a control program executed by the CPU, a required table, and other fixed data. A RAM 223 is a memory which stores an area where recorded data received from the host computer 100 is developed as well as variables to be used in controlling the respective units. A nonvolatile memory 224 is provided as a part of a memory area which is managed by the CPU 221 together with the ROM 222 and RAM 223. The memory 224 is a memory which can hold the stored contents even when the main printer is off and is also used to temporarily hold time information when an application liquid application mechanism is operated as explained later in FIG. 31. There can be used a nonvolatile RAM (NVRAM), an EEPROM and the like as the nonvolatile memory. Reference numeral 225 indicates an input unit into which an operator inputs and the input unit includes a power switch, a switch for starting printing and the like. Reference numeral 226 indicates a timer which measures a time of a waiting state where the application liquid application mechanism is not performed as explained in the later embodiment. Reference numeral 227 indicates a driving circuit which drives various driving units, and specifically, this circuit drives an application mechanism drive motor 260 which causes a recording head 230, a carriage motor 240, a transfer motor 250 and the application liquid application mechanism to be operated.

The following will describe an operation of the printer 1 of this embodiment explained with reference to FIGS. 27 and 28. Paper 11 is contained in the paper supply unit 10. The paper 11 is fed by the paper feeding roller 12. On the other hand, the application liquid 22 in the application liquid tank 21 of the application liquid application unit 20 is pumped by the pump roller 23, and the application liquid adheres to a roller surface of the application roller 25 to form a film of the application liquid with a uniform thickness by use of the film thickness control roller 24. After that, the application liquid 22 is uniformly and thinly applied to a recording area of the paper 11 by the application roller 25 and the counter roller 26. Then, the paper 11 is transferred, by the transfer rollers 31 to 33, to the recording area of the recording unit 36, while the application liquid 22 is being applied thereto. This transfer is carried out until application of the application liquid 22 to the entire recording area of the paper 11 is completed, and no recording is performed until this time. When the application of the application liquid 22 to the paper 11 is completed, the transfer rollers 31 to 33 are rotated reversely to return the paper 11 to the same passage as where the paper 11 has been transferred. Then, at the time of reverse rotation, the direction is changed by a paper guide 42 to guide the paper 11 to a paper withdrawal passage 45. With this operation, the top end of the paper 11 is returned to the recording start position of the recording area. Thereafter, the recording head scans the paper 11 by reciprocating movement of the carriage of the recording unit 36, and at this time, ink is ejected to the paper 11 from the recording head and recording is sequentially performed onto the recording area of the paper 11 to which the application liquid 22 has been applied. When the recording onto the paper 11 is completed, the paper 11 is discharged to a discharge unit 19 by discharge rollers 38 to 41.

Figure 32:
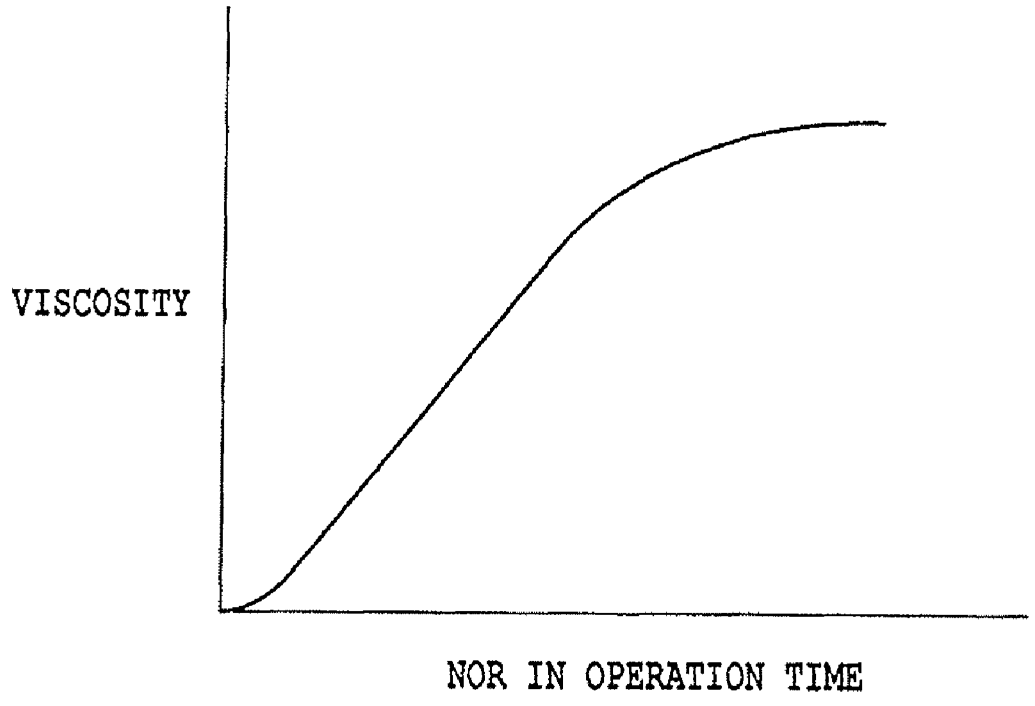
FIG. 32 is a diagram showing a relationship between a time in an unoperated state (for example, waiting time) where an application mechanism of the application roller is left unoperated and an increase in viscosity of treatment liquid.

As mentioned above, when a time passes in a state where the application liquid is adhered to the application roller, thickening progresses due to water vaporization to cause a problem that the application condition is gradually changed. FIG. 32 is a diagram showing a relationship between a time in an unoperated state (for example, waiting time) where the application mechanism such as the application roller is left unoperated, and an increase in viscosity of the application liquid. As illustrated in FIG. 32, the viscosity increases in proportion to the time, up to a certain time. Then, when a time reaches the certain time or more, almost all vaporizable components in the application liquid vaporize and only a non-vaporizable solvent remains and no vaporizable component is left, so that a change in the viscosity is small and the application liquid becomes saturated.

Figure 33:
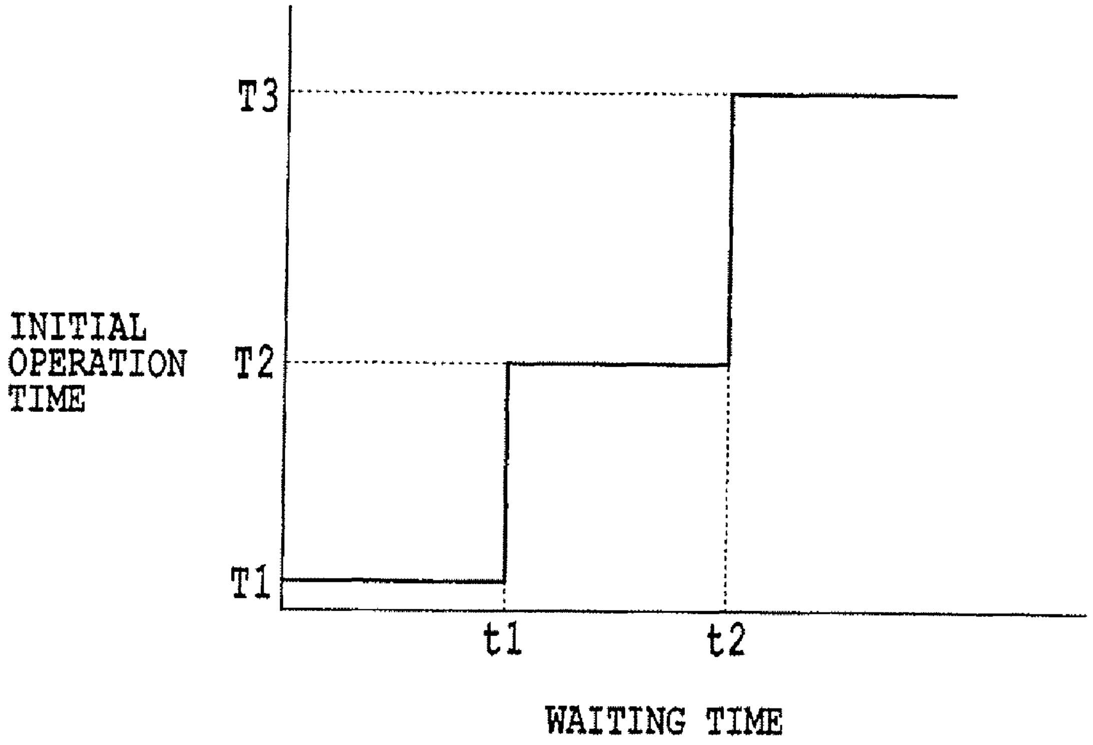
FIG. 33 is a diagram explaining a manner in which an operation time of the application initial operation is gradually changed according to a waiting time in an embodiment of the present invention.
Figure 34:
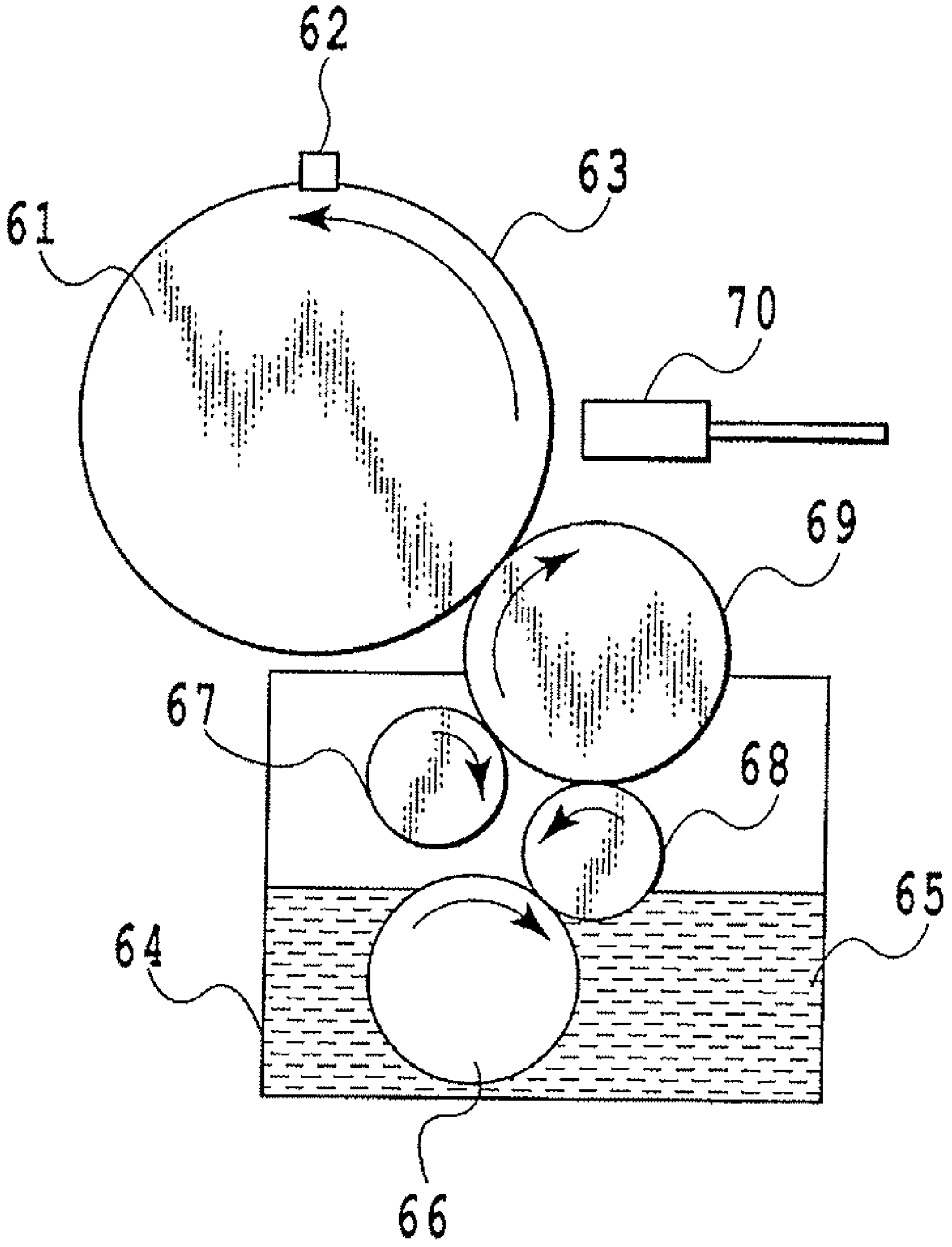
FIG. 34 is a cross sectional view showing a main part of a treatment liquid application mechanism in a conventional method which applies treatment liquid to an entire recording medium by using rollers.

Accordingly, in the embodiment of the present invention, an operation time of the application initial operation (also called preprocessing operation) before the application liquid application mechanism performs application to paper is changed in a stepwise manner according to an unoperated time or a waiting time, as shown in FIG. 33.

Figure 29:
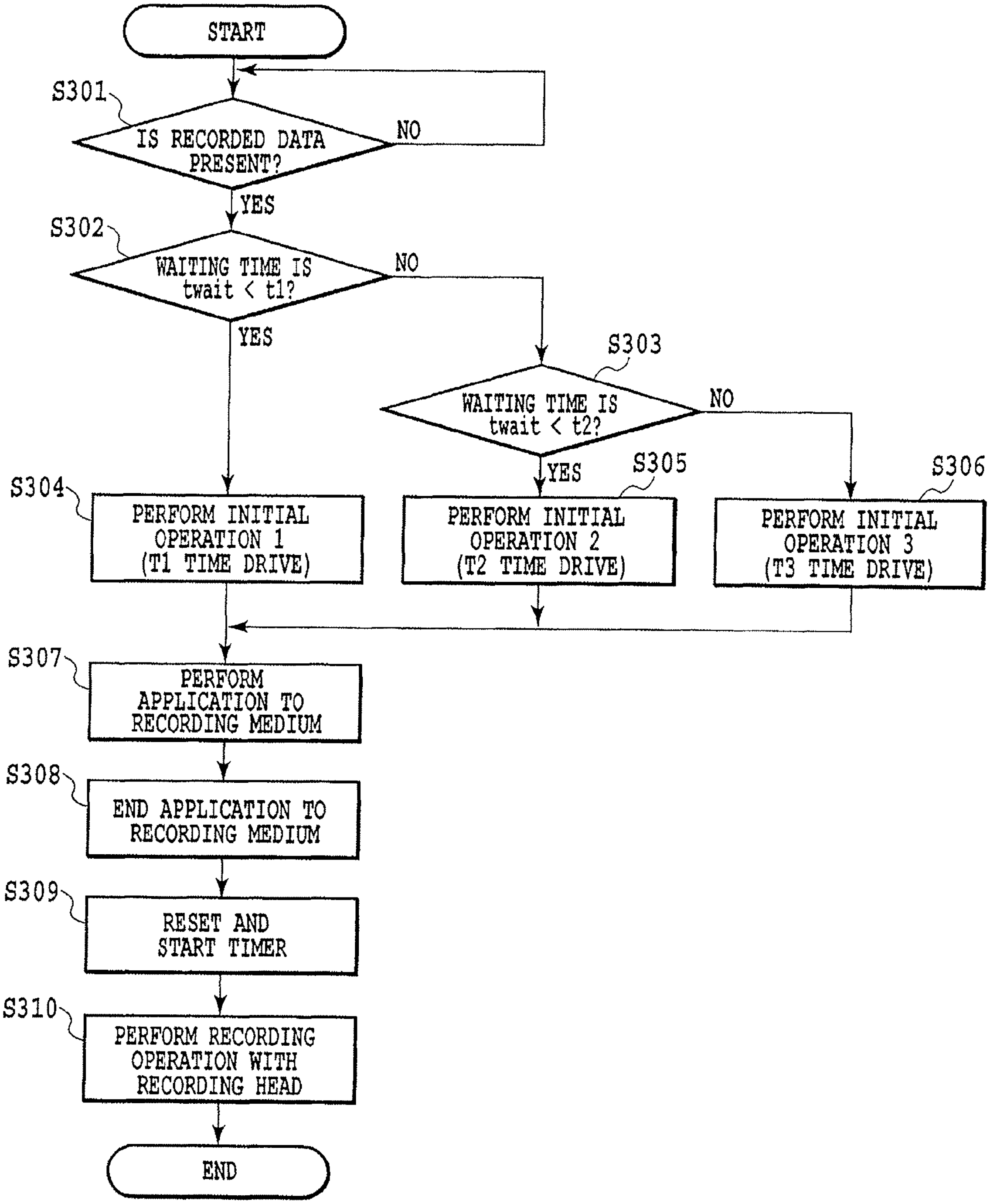
FIG. 29 is a flow chart showing mainly a control of the application initial operation in the sixth embodiment of the present invention.

FIG. 29 is a flow chart mainly showing a control of the application initial operation in the sixth embodiment of the present invention. In this embodiment, in the case where the power of the printer is on, an application initial operation time is changed according to a time waiting for the recording operation which the application operation accompanies.

First, in step 301, when a recording start instruction is inputted, recorded data is obtained from the host apparatus 100 such as the host computer. Then, in step 302, a waiting time twait, which is a lapse of time from the end time of the previous operation of the application liquid application mechanism, is read from the memory. Thereafter, it is determined whether the waiting time is shorter than the first time t1 shown in FIG. 33. The waiting time twait is a lapse of time between the end time of the previous rotation of the application roller 25 and the start time of the current rotation of the application roller 25. This waiting time twait is a lapse time from an end time of the previous rotation operation of the application roller 25 to an input time of the current recording start instruction.

When the waiting time twait is shorter than the first time t1, the operation goes to step 304 to perform application initial operation (preprocessing) 1 of a drive time T1. In this initial operation, the application liquid application unit 20 is operated without paper. Concretely, each roller composed the application liquid application unit 20 is rotated (performed preliminary rotation). Here, a drive time of step 304 is defined as T1. The application initial operation is performed to circulate the application liquid 22 on the respective rollers 23 to 26 and to make it possible to return the application liquid 22 on each of the rollers to a state where the viscosity thereof is within the general specified value.

When the waiting time twait is longer than first time t1 in step 302, the operation goes to step 303 and it is determined whether the waiting time twait is shorter than a second time t2, which is a second threshold value. When the waiting time twait is shorter than the second time t2, the operation goes to step 305 to perform application initial operation 2 of a drive time T2. This operation differs from the operation in step 304 in the point that the drive time T2 is longer than the drive time T1 in step 304 (T2>T1). This is because the viscosity of the application liquid on the respective rollers 23 to 26 of the application liquid application unit 20 is more increased than that of the case when the waiting time is below t1, resulting in an increase in the operation time. This makes it possible to stably return the application liquid 22 on the respective rollers 23 to 26 to a state where the viscosity thereof is within the general specified value.

When the waiting time twait is longer than the second time t2 in step 303, the operation goes to step 306 to perform application initial operation 3 of a drive time T3. This operation differs from the operation in step 305 in the point that the drive time T3 is longer than the drive time T2 in step 305 (T3>T2>T1). When the waiting time is t2 or more, the viscosity of the application liquid 22 on the respective rollers 23 to 26 of the application liquid application unit 20 is further increased, and this leads to the case that the rollers are stuck to one another in some cases. In this case, the drive time is more increased, thereby making it possible to return the application liquid 22 on the respective rollers 23 to 26 to a state where the viscosity thereof is within the general specified value, surely and with high reliability.

When the application initial operation of any of steps 304, 305 and 306 is finished, the operation goes to step 307 to transfer the recording paper onto the application liquid application unit 20 and to apply the application liquid to the recording paper. When the application of the application liquid to the recording paper is finished (step 308), a counter timer, which measures the waiting time, is reset and restarted in step 309. As a result, it is possible to measure the waiting time for deciding the application initial operation which is performed before the next application operation to the recording paper by the application liquid application unit. After that, the operation goes to step 310 to perform the recording operation by the recording head, and then, this processing is completed.

As mentioned above, according to this embodiment, the optimal application initial operation for the respective waiting times can be performed, and the condition for the application to the recording paper by the application rollers can be always maintained constant. Moreover, the part of the device is not suddenly moved in the waiting state where no recording operation is performed. Still moreover, when the waiting time is short, a time required for the application initial operation is shortened accordingly, so that a reduction in throughput is not caused.

SEVENTH EMBODIMENT

Figure 30:
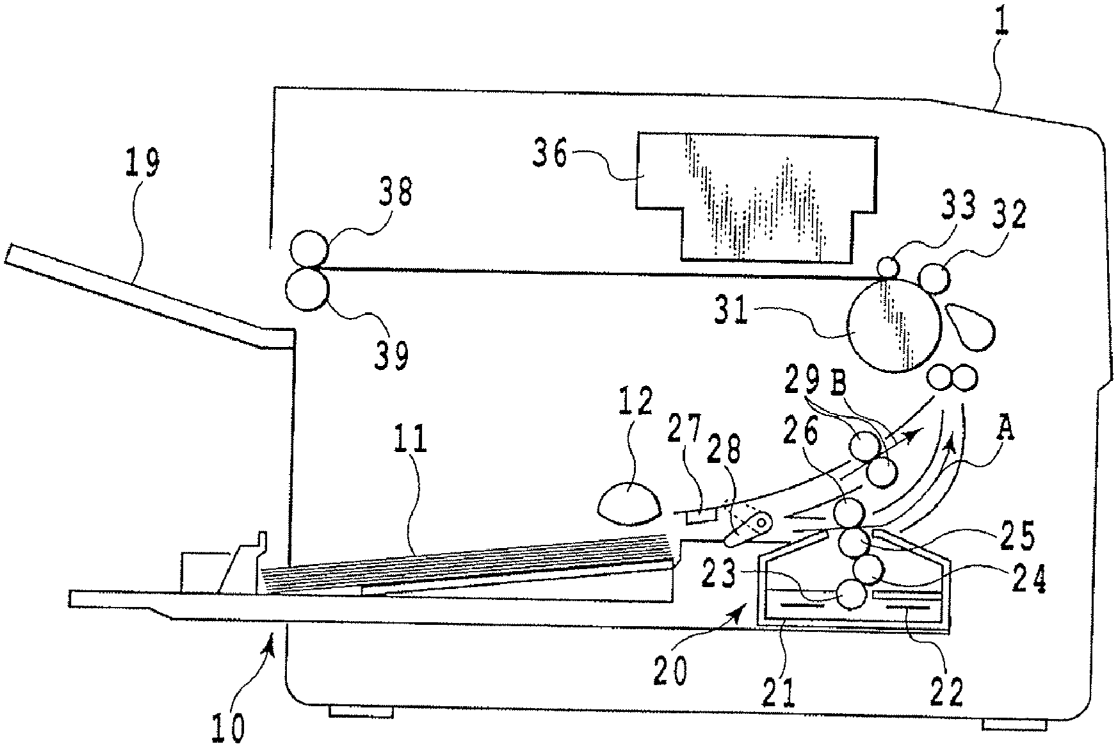
FIG. 30 is a cross sectional view showing a configuration of a printer in a seventh embodiment of the present invention.

FIG. 30 is a cross sectional view showing a configuration of a printer in a seventh embodiment of the present invention. In FIG. 30, the same reference numerals as those shown in FIG. 27 are used for the same components as those shown in FIG. 27, and the explanation is partially omitted. The printer of this embodiment includes an application passage for applying the application liquid to the recording medium by the application liquid application mechanism, and a no-application-necessary passage for applying no application liquid. The configuration shown in FIG. 30 is basically the same as that described in Japanese Patent Application Laid-open No. 2002-137378.

An application liquid application unit 20 includes a sensor 27, which detects markings such as coloring portions and holes formed on a back surface of paper 11, and this point is different from that of the sixth embodiment shown in FIG. 27. It is determined whether application processing should be needed to the paper according to the contents of the markings detected by the sensor 27. Moreover, there is also a difference therebetween in the point that a rotatable switching claw 28, which switches paper transfer channels between the application step channel (shown by an arrow A in the figure) and the no-application-necessary passage (shown by an arrow B in the figure), and a pair of transfer rollers 29 in the no-application-necessary passage are provided.

The following will explain a series of recording operations in a printer 1 having the aforementioned configuration of this embodiment. When the paper 11 housed in a paper supply unit 10 is fed by a paper feeding roller 12, the sensor 27 detects a marking formed on a predetermined position of the back surface of the paper 11. As a result of the detection, when the paper 11 is, for example, plain paper for which application is required, the switching claw 28 is rotated to a position shown by a dotted line in the figure to guide the paper 11 to the application step channel A. At this time, application liquid 22 in an application liquid tank 21 of the application liquid application unit 20 is pumped by a pump roller 23, and then, a film of the application liquid 22 with a uniform thickness is formed on the roller surface of an application roller 25 by a film thickness control roller 24. After that, the application liquid 22 is uniformly and thinly applied to the recording area of the paper 11 by the application roller 25 and a counter roller 26. The paper 11 to which the application liquid 22 is applied is sent to the recoding area of a recording unit 36 by transfer rollers 31 to 33. After that, the recoding head scans by reciprocating movement of the carriage, during this time ink is ejected to the paper 11 to which the application liquid 22 has been applied, and recording is sequentially performed. The paper 11 on which the recording is completed is discharged to a discharge unit 19 by a pair of discharge rollers 38 and 39.

On the other hand, as a result of the detection by the sensor 27, when the paper 11 is paper for which no liquid application is required, for example, an overhead transparency, a glossy film and the like, the switching claw 28 is placed at a position shown by a solid line in the figure to guide the paper 11 to the no-application-necessary passage B. Then, in the same manner as the case in which the application liquid is applied, the paper 11 is transferred to the recoding area of the recording unit 36 by the transfer roller 31 and the like, recording is performed onto the paper 11, and the paper 11 is finally discharged.

The above has explained the example in which the marking indicating the necessity or unnecessity of the liquid application is formed on the predetermined position of the back surface of the paper 11 and the marking is detected by the sensor to switch the channel. However, the present invention is not limited to this manner, a control signal based on information on a paper type, which an operator selects with the host apparatus such as a personal computer, may be transferred with recorded data, and the switching claw may be switched based on the information on the paper type. Moreover, the switching claw may be switched by a control signal with a cancel mode requiring that the liquid application is forcibly made unnecessary by the operator's instruction. Still moreover, paper supply units, which houses paper by paper types, may be provided corresponding to the application step channel and to the no-application-necessary passage. This makes it possible to prevent paper jam from occurring due to the switching claw.

Figure 31:
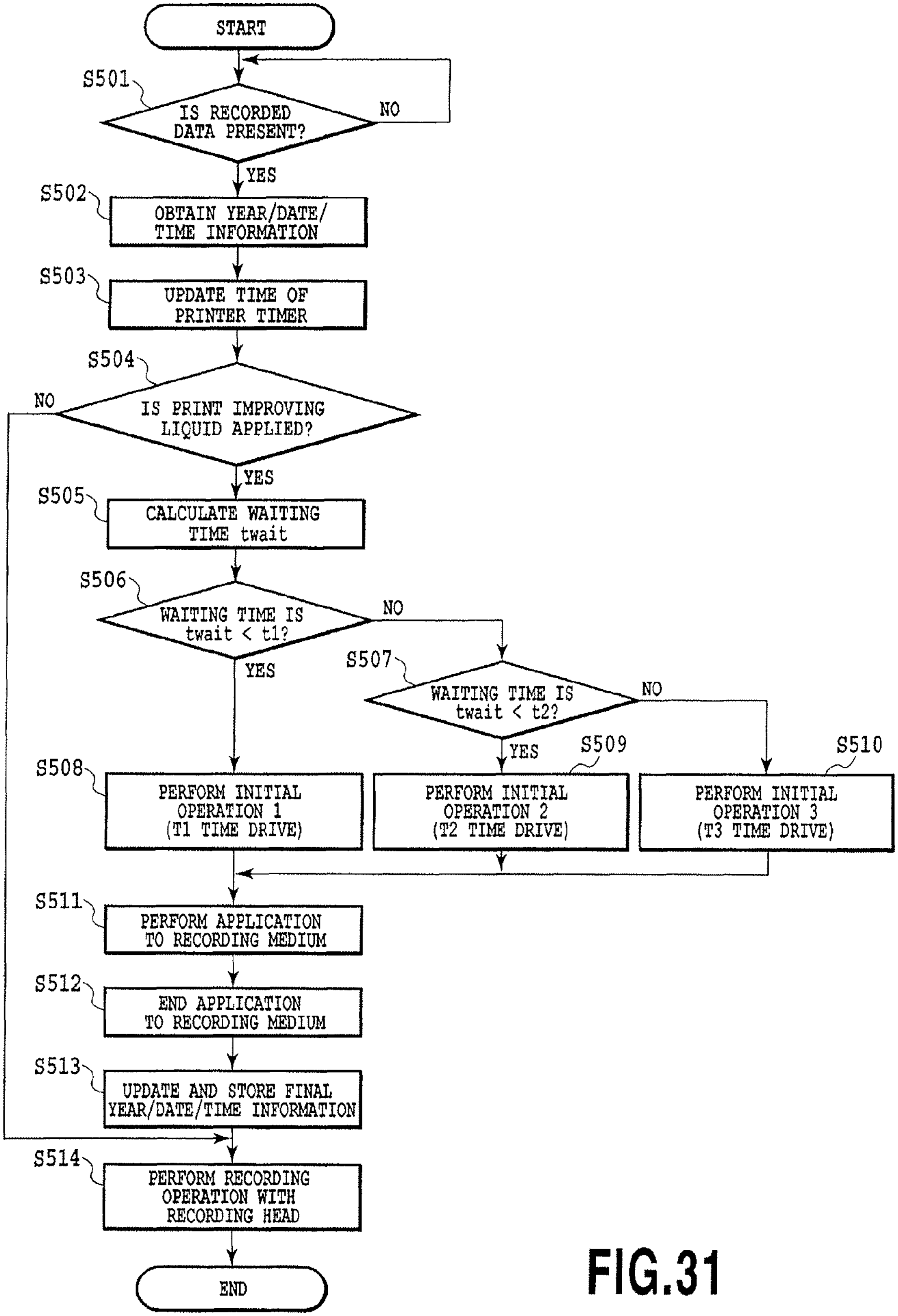
FIG. 31 is a flow chart showing mainly a control of the application initial operation in the seventh embodiment of the present invention.

FIG. 31 is a flow chart mainly showing a control of the application initial operation in the seventh embodiment of the present invention. In this embodiment, a waiting time is found in consideration to a time during which the printer is off, in order to perform the application initial operation suitable for the found waiting time.

Namely, in the case of the sixth embodiment, the waiting time can be measured by an electronic timer and the like when power of the printer is on. When the power of the printer is off, however, the waiting time cannot be measured unless a battery for the timer is mounted in the printer. For this reason, when the power of the printer is off, it is impossible to measure an unoperated time indicating how long the apparatus is left unoperated. Conventionally, as mentioned above, when the power is turned on, the application initial operation is uniformly performed regardless of a power-off time period. Moreover, since it is unclear how much degree the application liquid is thickened and stuck, there is a need to perform the application initial operation for the longest period of drive time. In this embodiment, the waiting time is accurately determined even just after the power is turned on, whereby making it possible to perform the optimal application initial operation for the application liquid thickening condition.

First, in step S501, when a recording start instruction is inputted, recorded data is obtained from the host apparatus 100, and year/date/time information transferred with the recorded data is obtained (step S502). Then, year/date/time information stored in the memory of the printer is updated based on the obtained information, and a time of the timer is updated. This enables the timer of the printer to measure a time to which a time period when the power is off is added.

Sequentially, in step S504, it is determined whether the application liquid should be applied based on the information on a recording paper type, which is added to the recorded data and transmitted from the host computer. Note that, in the case of the determination configuration shown in FIG. 30, the paper 11 is fed, and the marking thereon is detected by the sensor 27.

When it is determined that the application liquid should be applied in step S504, after reading the updated time of the printer's timer and the final year/date/time information, which is stored in the nonvolatile memory 224 and which indicates a time when the previous application operation is completed, a waiting time twait is calculated from these two pieces of year/date/time information in step S505. In this way, this waiting time can be a waiting time to which a power-off time period is added.

The following steps 506 to 512 are the same as the steps 302 to 308 shown in FIG. 3 and the explanation is omitted.

When the application operation to the recording medium is finished in step S512, the current time is read from the timer of the printer and the read current time is used for updating the final year/date/time information and stored in the nonvolatile memory 224 in step S513. This makes it possible to calculate a waiting time for the next application operation. The final year/date/time information of the application operation is thus stored in the nonvolatile memory 224. Consequently, the final year/date/time information can be prevented from being lost even when the power is off. As a result, it is possible to calculate the waiting time accurately even when the power is turned on again and the application liquid has to be applied before the recording operation. This makes it possible to control to achieve the optimal application initial operation according to differences in degrees of thickening on the application roller, the differences resulted from differences in the waiting times of the liquid application mechanism.

When it is determined that no liquid application is needed in step S504, the operation goes to step S514, the application initial operation and the application operation to the recording medium are skipped, and the recording operation is performed.

It should be noted that control of the application initial operation is not limited to the three stages. Moreover, control of the application initial operation is not limited to the drive time of the application roller. For example, the rotational speed of the application roller may be controlled. As mentioned above, performing the application initial operation according to the waiting time reduces the viscosity of the application liquid on elements, such as the application roller of the application mechanism, to which the application liquid is stuck. Then, a driving control changes degrees of the operation for the reduction of the viscosity of the application liquid according to the waiting time, in order to ensure the appropriate reduction of the viscosity of the application liquid.

Furthermore, when the waiting time is considerably short, such condition that no initial operation is performed may be provided.

In the processing shown in FIG. 31, the year/date/time information is obtained for each recording operation, and for each time the year/date/time information is updated to a time of the printer's timer in step S503. However, the update does not have to be performed for each time and the following manner may also be adapted. The year/date/time information may be updated to the time of the printer's timer, only when the year/date/time information is obtained for the first time after the power is turned on. In addition, it does not matter whether the application initial operation of the application liquid application mechanism is performed in parallel with start-up preparation operation such as cleaning of the recording head and data transfer operation, or performed sequentially. By performing the operation in parallel, however, the total printing time (throughput) can be shortened. Furthermore, for convenience of description, this embodiment has explained the example in which the application step of application liquid to the recording medium and the recording step onto the recording medium by the recording head are sequentially performed. However, these operations may be performed in parallel.

In the above first to seventh embodiments, "a time between the completion of the processing associated with the previous liquid application and the start of the processing associated with the current liquid application" is defined as "a lapse of time" or "a waiting time" (this is referred to as a former definition). However, in the embodiments where the preprocessing is performed immediately after power-on, "a time between the completion of the processing associated with the previous liquid application and the power-on" may be defined as "a lapse of time" or "a waiting time" (this is referred to as a latter definition). Even in the latter definition, "the completion of the processing associated with the previous liquid application" indicates the completion of the collection operation, the completion of the rotation application, the completion of the application operation, and the like, as with the case of the former definition. In this specification including both definitions, "a lapse of time" or "a waiting time" is defined as "a lapse period which passes after the processing associated with the previous liquid application is completed."

In addition, the specific configurations explained in the first to seventh embodiments can be partially combined as far as no contradiction occurs due to the combination thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a continuation application of PCT application No. PCT/JP2006/315884 under 37 Code of Federal Regulations § 1.53 (b) and the said PCT application claims the benefit of Japanese Patent Application Nos. 2005-233269, filed Aug. 11, 2005 and 2005-348250, filed Dec. 1, 2005, which are hereby incorporated by reference herein in their entirety.

What is claimed is:

1. A liquid application device comprising:

an application roller configured to apply a liquid to a medium;

an obtaining unit configured to obtain information relating to a period elapsed from a completion of a processing associated with a previous liquid application by the application roller, in response to an input of an application start command;

a determining unit configured to determine a condition relating to a rotation of the application roller based on the information obtained by the obtaining unit, wherein the condition relating to the rotation of the application roller is one of a condition relating to the number of rotations of the application roller and a condition relating to the time of the rotation of the application roller; and a preprocessing unit configured to perform, in response to the condition determined by the determining unit, a preprocessing including a preliminary rotation of the application roller before a performance of a liquid application based on the application start command.

2. The liquid application device according to claim 1, further comprising:

a liquid retention member configured to abut the application roller for retaining the liquid, wherein the liquid retained by the liquid retention member is applied to the medium by the rotation of the application roller.

3. The liquid application device according to claim 2, further comprising:

a storing unit configured to store the liquid;

a passage for connecting the liquid retention member and the storing unit; and a collecting unit configured to collect the liquid from the liquid retention member for storage in the storing unit via the passage, wherein the completion of the processing associated with the previous liquid application is a completion of a previous liquid collection by the collecting unit.

4. The liquid application device according to claim 2, further comprising:

a storing unit configured to store the liquid;

a passage for connecting the liquid retention member and the storing unit; and a circulating unit configured to circulate the liquid in a channel connecting the passage, the storing unit and the liquid retention member, wherein the preprocessing unit performs the preprocessing during the circulation of the liquid.

5. The liquid application device according to claim 1, further comprising:

a recording unit configured to record an image by discharging ink to the medium to which the liquid is applied by the application roller.

6. The liquid application device according to claim 5, wherein the liquid includes a component for coagulating a colorant in the ink.

7. A liquid application device comprising:

an application roller configured to apply a liquid to a medium;

an obtaining unit configured to obtain information relating to a period elapsed from a completion of a processing associated with a previous liquid application by the application roller, in response to an input of an application start command;

a determining unit configured to determine a condition relating to a rotation of the application roller based on the information obtained by the obtaining unit, wherein the condition relating to the rotation of the application roller is a condition relating to the number of rotations of the application roller; and a preprocessing unit configured to perform, in response to the condition determined by the determining unit, a preprocessing including a preliminary rotation of the application roller before a performance of a liquid application based on the application start command, and wherein the number determined by the determining unit in a case where the period indicated by the information is longer than a predetermined period is more than the number determined by the determining unit in a case where the period indicated by the information is shorter than the predetermined period.

8. The liquid application device according to claim 7, wherein the number determined by the determining unit in a case where the period indicated by the information is shorter than a predetermined period is zero.

9. A liquid application device comprising:

an application roller configured to apply a liquid to a medium;

an obtaining unit configured to obtain information relating to a period elapsed from a completion of a processing associated with a previous liquid application by the application roller, in response to an input of an application start command;

a determining unit configured to determine a condition relating to a rotation of the application roller based on the information obtained by the obtaining unit, wherein the condition relating to the rotation of the application roller is a condition relating to the time of the rotation of the application roller; and a preprocessing unit configured to perform, in response to the condition determined by the determining unit, a preprocessing including a preliminary rotation of the application roller before a performance of a liquid application based on the application start command, and wherein the time determined by the determining unit in a case where the period indicated by the information is longer than a predetermined period is longer than the time determined by the determining unit in a case where the period indicated by the information is shorter than the predetermined period.

* * * * *